US007458904B2

(12) United States Patent
Sullivan et al.

(10) Patent No.: US 7,458,904 B2
(45) Date of Patent: Dec. 2, 2008

(54) MULTILAYER GOLF BALL

(75) Inventors: Michael J. Sullivan, Barrington, RI (US); Derek A. Ladd, Acushnet, MA (US); Edmund A. Hebert, Fairhaven, MA (US); Herbert C. Boehm, Norwell, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 11/353,563

(22) Filed: Feb. 14, 2006

(65) Prior Publication Data

US 2006/0142096 A1    Jun. 29, 2006

Related U.S. Application Data

(60) Continuation-in-part of application No. 10/670,514, filed on Sep. 26, 2003, now Pat. No. 7,041,007, which is a continuation-in-part of application No. 09/482,336, filed on Jan. 14, 2000, now Pat. No. 6,635,133, which is a division of application No. 09/312,480, filed on May 17, 1999, now Pat. No. 6,575,846, which is a continuation of application No. 08/902,351, filed on Jul. 29, 1997, now abandoned, which is a continuation-in-part of application No. 08/615,346, filed on Mar. 11, 1996, now Pat. No. 5,683,312.

(51) Int. Cl.
*A63B 37/08* (2006.01)

(52) U.S. Cl. ....................................... 473/354

(58) Field of Classification Search ................ 473/354, 473/373, 374
See application file for complete search history.

(56) References Cited

U.S. PATENT DOCUMENTS

| 1,568,513 | A | 1/1926  | Lewis            |
| 1,904,012 | A | 4/1933  | Reichard         |
| 5,150,906 | A | 9/1992  | Molitor et al.   |
| 5,306,760 | A | 4/1994  | Sullivan         |
| 5,312,857 | A | 5/1994  | Sullivan         |
| 5,480,155 | A | 1/1996  | Molitor et al.   |
| 5,683,312 | A | 11/1997 | Boehm et al.     |
| 5,688,191 | A | 11/1997 | Cavallaro et al. |
| 5,789,475 | A | 8/1998  | Chen             |
| 5,803,831 | A | 9/1998  | Sullivan et al.  |
| 5,902,855 | A | 5/1999  | Sullivan         |

(Continued)

FOREIGN PATENT DOCUMENTS

WO    WO 00/23519    4/2000

(Continued)

*Primary Examiner*—Raeann Trimiew
(74) *Attorney, Agent, or Firm*—Kristin D. Wheeler

(57) ABSTRACT

The present invention encompasses a golf ball having a diameter and being comprised of a core and a cover, wherein the core is further comprised of a fluid mass at the center of the ball, and a first, solid, non-wound mantle layer surrounding the fluid mass, wherein the first mantle layer comprises a copolymer or terpolymer of ethylene and an a,β-unsaturated carboxylic acid, the acid being neutralized at least 80% by a salt of an organic acid, a cation source, or a suitable base of the organic acid, and wherein the cover comprises polyurethane, polyurea, or a polyurea/polyurethane hybrid. Preferably, the rate of spin decay is at least 10% of an initial spin rate of the golf ball over the entire ball flight.

45 Claims, 17 Drawing Sheets

U.S. PATENT DOCUMENTS

| | | |
|---|---|---|
| 5,962,140 A | 10/1999 | Rajagopalan |
| 5,973,046 A | 10/1999 | Chen et al. |
| 6,042,488 A * | 3/2000 | Sullivan et al. ............. 473/374 |
| 6,083,119 A | 7/2000 | Sullivan et al. |
| 6,100,321 A | 8/2000 | Chen |
| 6,200,230 B1 | 3/2001 | Maruko |
| 6,238,304 B1 | 5/2001 | Scolamiero et al. |
| 6,244,977 B1 | 6/2001 | Sullivan et al. |
| 6,299,550 B1 * | 10/2001 | Molitor et al. .............. 473/354 |
| 6,329,458 B1 | 12/2001 | Takesue et al. |
| 6,406,384 B2 | 6/2002 | Sullivan et al. |
| 6,561,927 B1 | 5/2003 | Sullivan et al. |
| 6,575,846 B1 | 6/2003 | Boehm et al. |
| 6,616,549 B2 | 9/2003 | Dalton et al. |
| 6,635,133 B1 | 10/2003 | Boehm et al. |
| 6,635,716 B2 | 10/2003 | Voorheis et al. |
| 6,743,123 B2 | 6/2004 | Sullivan |
| 6,756,436 B2 | 6/2004 | Rajagopalan et al. |
| 6,899,642 B2 | 5/2005 | Morgan et al. |
| 2001/0018375 A1 | 8/2001 | Hayashi et al. |
| 2001/0019971 A1 | 9/2001 | Hayashi et al. |
| 2002/0013421 A1 | 1/2002 | Takesue et al. |
| 2002/0037968 A1 | 3/2002 | Chen |
| 2002/0055400 A1 | 5/2002 | Higuchi et al. |
| 2002/0061793 A1 | 5/2002 | Higuchi et al. |
| 2002/0091188 A1 | 7/2002 | Statz et al. |
| 2002/0098915 A1 * | 7/2002 | Cavallaro et al. ........... 473/354 |
| 2002/0099120 A1 | 7/2002 | Takesue et al. |
| 2002/0111407 A1 | 8/2002 | Takesue et al. |
| 2002/0177492 A1 | 11/2002 | Watanabe et al. |
| 2005/0049367 A1 | 3/2005 | Rajagopalan et al. |

FOREIGN PATENT DOCUMENTS

WO    WO 01/29129 A1    4/2001

* cited by examiner

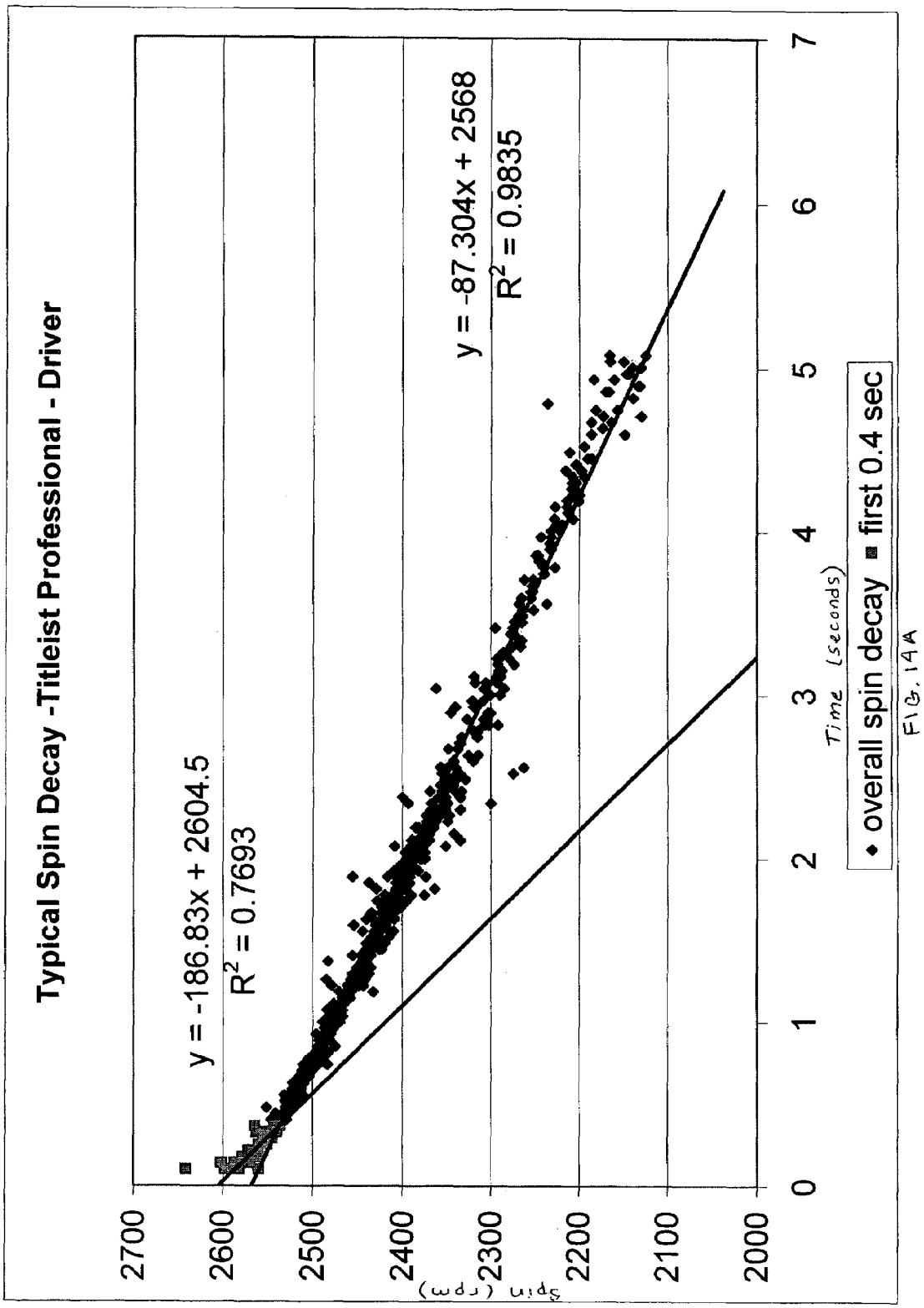

MULTILAYER GOLF BALL

This application is a continuation-in-part of U.S. patent application Ser. No. 10/670,514 filed on Sep. 26, 2003 now U.S. Pat. No. 7,041,007, which is a continuation-in-part of U.S. patent application Ser. No. 09/482,336, filed on Jan. 14, 2000, now U.S. Pat. No. 6,635,133, which is a divisional of U.S. patent application Ser. No. 09/312,480, filed on May 17, 1999, now U.S. Pat. No. 6,575,846, which is a continuation of U.S. patent application Ser. No. 08/902,351, filed on Jul. 29, 1997, now abandoned, which is a continuation-in-part of U.S. patent application Ser. No. 08/615,346, filed on Mar. 11, 1996, now U.S. Pat. No. 5,683,312. These applications are hereby incorporated herein by reference in their entirety.

FIELD OF THE INVENTION

The present invention is directed to a multilayered golf ball having a plurality of core parts arranged around a center and bound to each other by an adhesive. Particularly, the present invention encompasses a golf ball having a core comprised of a fluid mass at the center of the ball, and a non-wound first mantle layer surrounding the fluid mass.

BACKGROUND OF THE INVENTION

Generally, golf balls have been classified as two piece balls or three piece balls. Two piece balls are comprised of a solid polymeric core and a cover. These balls are generally easy to manufacture, but are regarded as having limited playing characteristics. Three piece balls are comprised of a solid or liquid-filled center surrounded by tensioned elastomeric material and a cover. Three piece balls generally have a good "click" and "feel" when struck by a golf club, but are more difficult to manufacture than two piece balls.

The prior art is comprised of various golf balls that have been designed to provide optimal playing characteristics. These characteristics are generally the initial velocity and spin of the golf ball, which can be optimized for various players. For instance, certain players prefer to play a ball that has a high spin rate for playability. Other players prefer to play a ball that has a low spin rate to maximize distance. However, these balls tend to be hard feeling and difficult to control around the greens.

The prior art is comprised of liquid filled golf balls. Wound golf balls have been made with liquid filled centers for many years. Both U.S. Pat. Nos. 1,568,513 and 1,904,012 are directed to wound golf balls with liquid filled centers. U.S. Pat. Nos. 5,150,906 and 5,480,155, are directed to a hollow spherical shell of a polymeric material which is filled with a liquid or unitary, non-cellular material that is a liquid when introduced into the shell. The shell is disclosed as being the outer cover or an inner layer with the outer cover formed to the external surface thereof. The shell varies in thickness from about 0.060 to 0.410 inches in thickness.

Other known attempts to mold layers around a solid center entail placing a preformed center between two blocks of core material in a spherical compression mold, and closing the mold. This is done in the manufacture of golf balls sold by Kamatari. This process, however, provides little control over the ultimate placement of the center within the golf ball core. Large variations in center eccentricities can result.

The prior art also provides for the manufacture of double cover golf balls. This is generally accomplished by injection molding a first and then a second cover layer around a core. This system, however, requires complex injection molds, usually with retractable pins within the mold to properly position the core.

SUMMARY OF THE INVENTION

The present invention relates to a golf ball having a diameter and being comprised of a core and a cover, wherein the core is further comprised of a fluid mass at the center of the ball, a first mantle layer surrounding the fluid mass and a second, solid, non-wound mantle layer surrounding and abutting the first mantle layer, wherein the first mantle layer comprises a polymer material selected from the group consisting of a thermoset rubber, plastic and thermoplastic elastomeric material and the second mantle layer comprises a polymer material selected from the group consisting of a thermoset rubber material and thermoplastic elastomeric material, and wherein the cover comprises polyurethane, polyurea, or a polyurea/polyurethane hybrid.

In one embodiment, the fluid mass in the core is a gas, liquid, gel, paste or a combination thereof. In another embodiment, the fluid mass is a liquid having a low coefficient of thermal expansion or high boiling point. In a preferred embodiment, the fluid mass is a liquid having a low coefficient of thermal expansion or high boiling point that is selected from the group consisting of an oil, a polyol and mixtures thereof. In yet another embodiment, the fluid mass is a gas, wherein the gas is selected from the group consisting of air, nitrogen, helium, argon, neon, carbon dioxide, nitrous oxide and mixtures thereof.

In one embodiment, the first mantle layer comprises dynamically vulcanized thermoplastic elastomer, functionalized styrene-butadiene elastomer, thermoplastic polyurethane, thermoplastic polyetherester or polyetheramide, thermoplastic ionomer resin, thermoplastic polyester, metallocene polymer or blends thereof. In another embodiment, the cover comprises an inner cover layer and a thin outer cover layer, wherein the outer cover layer comprises a thermoset material formed from a castable, reactive liquid and the inner cover layer comprises a high flexural modulus material.

In yet another embodiment, the core, cover, first mantle layer or second mantle layer comprises a polymer containing an acid group that is neutralized by an organic acid or a salt thereof, the organic acid or salt thereof being present in an amount sufficient to neutralize the polymer by at least about 70%. In a preferred embodiment, the polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof. In another preferred embodiment, the organic acid is selected from the group consisting of aliphatic organic acids, aromatic organic acids, saturated mono-functional organic acids, unsaturated mono-functional organic acids, and multi-unsaturated mono-functional organic acids. In yet another preferred embodiment, the salt of organic acids comprise barium, lithium, sodium, zinc, bismuth, chromium, cobalt, copper, potassium, strontium, titanium, tungsten, magnesium, cesium, iron, nickel, silver, aluminum, tin, and calcium salts of stearic acid, behenic acid, erucic acid, oleic acid, linoelic acid, dimerized derivatives, and mixtures thereof.

In one embodiment, the golf ball diameter is at least 1.68 inches. In another embodiment, the first mantle layer has an inner diameter of about 0.75 to 1.1 inches. In yet another embodiment, the core diameter is about 1.590 inches or greater. In another embodiment, the cover has a thickness of from about 0.015 to 0.12 inches.

In another embodiment, the first mantle layer or second mantle layer further comprises a halogenated thiophenol. Preferably, the halogenated thiophenol is zinc pentachlorothiophenol.

In yet another embodiment, the cover comprises polyether polyester thermoplastic urethane, thermoset polyurethane, polyurea, or polyurethane/polyurea hybrid that is formed from an isocyanate prepolymer. Preferably, the isocyanate prepolymer is paraphenylene diisocyanate.

In one embodiment, the golf ball has a moment of inertia of greater than 0.460 oz-in$^2$. In another embodiment, the golf ball has a moment of inertia of less than 0.450 oz-in$^2$.

The present invention also encompasses a golf ball having a diameter and being comprised of a core and a cover, wherein the core is further comprised of a fluid mass at the center of the ball, a first mantle layer surrounding the fluid mass and a second, solid, non-wound mantle layer surrounding and abutting the first mantle layer, wherein the first mantle layer comprises a polymer material selected from the group consisting of a thermoset rubber, plastic and thermoplastic elastomeric material and the second mantle layer comprises a polymer material selected from the group consisting of a thermoset rubber material and thermoplastic elastomeric material, and wherein the cover comprises material selected from the group consisting of polyether and polyester thermoplastic urethane, thermoset polyurethane, ionomer resins, low modulus ionomers, high modulus ionomers and blends thereof. In one embodiment, the cover comprises a thermoset polyurethane.

In one embodiment, the fluid mass a liquid having a low coefficient of thermal expansion or high boiling point. In a preferred embodiment, the fluid mass is a liquid having a low coefficient of thermal expansion or high boiling point that is selected from the group consisting of an oil, a polyol and mixtures thereof. In yet another embodiment, the fluid mass is a gas, wherein the gas is selected from the group consisting of air, nitrogen, helium, argon, neon, carbon dioxide, nitrous oxide and mixtures thereof.

In one embodiment, the first mantle layer comprises dynamically vulcanized thermoplastic elastomer, functionalized styrene-butadiene elastomer, thermoplastic polyurethane, thermoplastic polyetherester or polyetheramide, thermoplastic ionomer resin, thermoplastic polyester, metallocene polymer or blends thereof. In another embodiment, the cover comprises an inner cover layer and a thin outer cover layer, wherein the outer cover layer comprises a thermoset material formed from a castable, reactive liquid and the inner cover layer comprises a high flexural modulus material.

In yet another embodiment, the core, cover, first mantle layer or second mantle layer comprises a polymer containing an acid group that is neutralized by an organic acid or a salt thereof, the organic acid or salt thereof being present in an amount sufficient to neutralize the polymer by at least about 70%. In a preferred embodiment, the polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof. In another preferred embodiment, the organic acid is selected from the group consisting of aliphatic organic acids, aromatic organic acids, saturated mono-functional organic acids, unsaturated mono-functional organic acids, and multi-unsaturated mono-functional organic acids. In yet another preferred embodiment, the salt of organic acids comprise barium, lithium, sodium, zinc, bismuth, chromium, cobalt, copper, potassium, strontium, titanium, tungsten, magnesium, cesium, iron, nickel, silver, aluminum, tin, and calcium salts of stearic acid, behenic acid, erucic acid, oleic acid, linoelic acid, dimerized derivatives, and mixtures thereof.

In one embodiment, the golf ball diameter is at least 1.68 inches. In another embodiment, the first mantle layer has an inner diameter of about 0.75 to 1.1 inches. In yet another embodiment, the core diameter is about 1.590 inches or greater. In another embodiment, the cover has a thickness of from about 0.015 to 0.12 inches.

In another embodiment, the first mantle layer or second mantle layer further comprises a halogenated thiophenol. Preferably, the halogenated thiophenol is zinc pentachlorothiophenol.

In one embodiment, the golf ball has a moment of inertia of greater than 0.460 oz-in$^2$. In another embodiment, the golf ball has a moment of inertia of less than 0.450 oz-in$^2$.

The present invention further encompasses a golf ball having a diameter and being comprised of a core and a cover, wherein the core is further comprised of a fluid mass at the center of the ball, a first mantle layer surrounding the fluid mass and a second, solid, non-wound mantle layer surrounding and abutting the first mantle layer, wherein the first mantle layer comprises a polymer material selected from the group consisting of a thermoset rubber, plastic and thermoplastic elastomeric material and the second mantle layer comprises two or more layers, each made from material that comprises a polymer material selected from the group consisting of a thermoset rubber material and thermoplastic elastomeric material. In a preferred embodiment, the thermoset rubber material is selected from the group consisting of polyisoprene, styrene butadiene, polybutadiene and mixtures thereof. In another preferred embodiment, the thermoplastic elastomeric material is selected from the group consisting of copolymers of methyl-methacrylate with butadiene and styrene, copolymers of methyl-acrylate with butadiene and styrene, acrylonitrile styrene copolymers, polyether-ester, polyether-amide, polyurethane, propylene/ethylene-propylene-diene rubber, styrene-butadiene elastomers, metallocene polymers, polyetheresters, polyetheramides, ionomer resins, polyesters, and blends thereof.

In one embodiment, the fluid mass in the core is a liquid having a low coefficient of thermal expansion or high boiling point. In a preferred embodiment, the fluid mass is a liquid having a low coefficient of thermal expansion or high boiling point that is selected from the group consisting of an oil, a polyol and mixtures thereof. In yet another embodiment, the fluid mass is a gas, wherein the gas is selected from the group consisting of air, nitrogen, helium, argon, neon, carbon dioxide, nitrous oxide and mixtures thereof.

In one embodiment, the first mantle layer comprises dynamically vulcanized thermoplastic elastomer, functionalized styrene-butadiene elastomer, thermoplastic polyurethane, thermoplastic polyetherester or polyetheramide, thermoplastic ionomer resin, thermoplastic polyester, metallocene polymer or blends thereof. In another embodiment, the cover comprises an inner cover layer and a thin outer cover layer, wherein the outer cover layer comprises a thermoset material formed from a castable, reactive liquid and the inner cover layer comprises a high flexural modulus material.

In yet another embodiment, the core, cover, first mantle layer or second mantle layer comprises a polymer containing an acid group that is neutralized by an organic acid or a salt thereof, the organic acid or salt thereof being present in an amount sufficient to neutralize the polymer by at least about 70%. In a preferred embodiment, the polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof. In another preferred embodiment, the organic acid is selected from the group consisting of aliphatic organic acids, aromatic organic acids, saturated mono-functional organic acids, unsaturated mono-functional organic acids, and multi-unsaturated mono-functional organic acids. In yet another preferred embodiment, the salt of organic acids comprise barium, lithium, sodium, zinc, bismuth, chromium, cobalt, copper, potassium, strontium, titanium, tungsten, magnesium, cesium, iron, nickel, silver, aluminum, tin, and calcium salts of stearic acid, behenic acid, erucic acid, oleic acid, linoelic acid, dimerized derivatives, and mixtures thereof.

In one embodiment, the golf ball diameter is at least 1.68 inches. In another embodiment, the first mantle layer has an inner diameter of about 0.75 to 1.1 inches. In yet another embodiment, the core diameter is about 1.590 inches or greater. In another embodiment, the cover has a thickness of from about 0.015 to 0.12 inches.

In another embodiment, the first mantle layer or second mantle layer further comprises a halogenated thiophenol. Preferably, the halogenated thiophenol is zinc pentachlorothiophenol.

In one embodiment, the golf ball has a moment of inertia of greater than 0.460 oz-in$^2$. In another embodiment, the golf ball has a moment of inertia of less than 0.450 oz-in$^2$.

In another embodiment, a golf ball having a diameter and being comprised of a core and a cover is provided. The core is further comprised of a fluid mass at the center of the ball, and a first, solid, non-wound layer surrounds the fluid mass. The first layer comprises a copolymer or terpolymer of ethylene and an a,β-unsaturated carboxylic acid, the acid being neutralized at least 80% by a salt of an organic acid, a cation source, or a suitable base of the organic acid. The cover comprises polyurethane, polyurea, or a polyurea/polyurethane hybrid.

According to another embodiment, a golf ball having a diameter and being comprised of a core and a cover is provided. The core is further comprised of a fluid mass at the center of the ball, a shell encompassing the fluid mass, and a first, solid, non-wound mantle layer surrounding the shell. The first mantle layer comprises a copolymer or terpolymer of ethylene and an a,β-unsaturated carboxylic acid, the acid being neutralized at least 80% by a salt of an organic acid, a cation source, or a suitable base of the organic acid. The cover comprises polyurethane, polyurea, or a polyurea/polyurethane hybrid.

In yet another embodiment, a golf ball having a diameter and being comprised of a core and a cover is provided. The core is comprised of a fluid mass at the center of the ball, and a first, solid, non-wound mantle layer surrounding the fluid mass. The first mantle layer comprises a copolymer or terpolymer of ethylene and an a,β-unsaturated carboxylic acid, the acid being neutralized at least 80% by a salt of an organic acid, a cation source, or a suitable base of the organic acid. The cover comprises polyurethane, polyurea, or a polyurea/polyurethane hybrid. The rate of spin decay for the golf ball is at least 10% of an initial spin rate of the golf ball over the entire ball flight.

BRIEF DESCRIPTION OF THE DRAWINGS

Further features and advantages of the invention can be ascertained from the following detailed description that is provided in connection with the drawings described below:

FIGS. 14A-D are graphs depicting spin decay rates for the present invention and prior art golf balls.

DETAILED DESCRIPTION OF THE INVENTION

The golf balls of the present invention encompass any type of ball construction. For example, the golf ball may have at least a three-piece design, a multi-layer core, a multi-layer cover, one or more mantle or intermediate layers. As used herein, the term "multi-layer" means at least two layers. As used herein, the term "layer" includes any generally spherical portion of a golf ball, i.e., a golf ball core or center, mantle layer, and or a golf ball cover.

Figure 1:
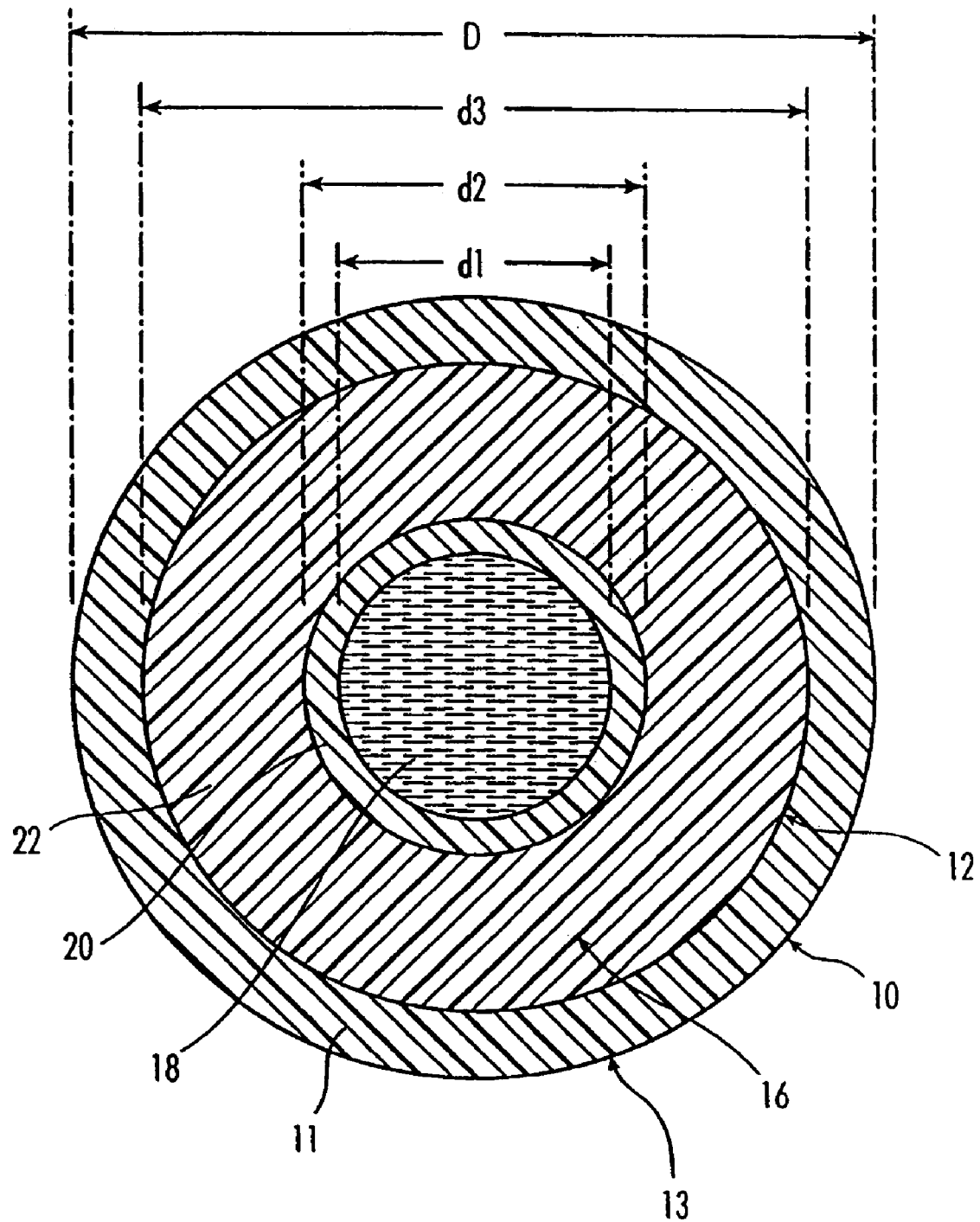
FIG. 1 is a sectional view of a ball of the present invention.

Referring to FIG. 1, ball 10 includes a cover 11 and a core 12. As used herein, the term "core" means the innermost portion of a golf ball, and may include one or more layers. When a multi-layer core is contemplated, the core is the innermost component with one or more additional core layers disposed thereon. At least a portion of the core, typically the center, is solid, semi-solid, hollow, powder-filled or fluid-filled, preferably fluid-filled. As used herein, the term "fluid" means a gas, liquid, gel, paste, or the like, or a combination thereof. In one embodiment, the core 12 has an inner sphere 13 that is disposed concentrically therein and which preferably comprises a fluid center 18 in a cavity within a liquid center shell 20.

Figure 2:
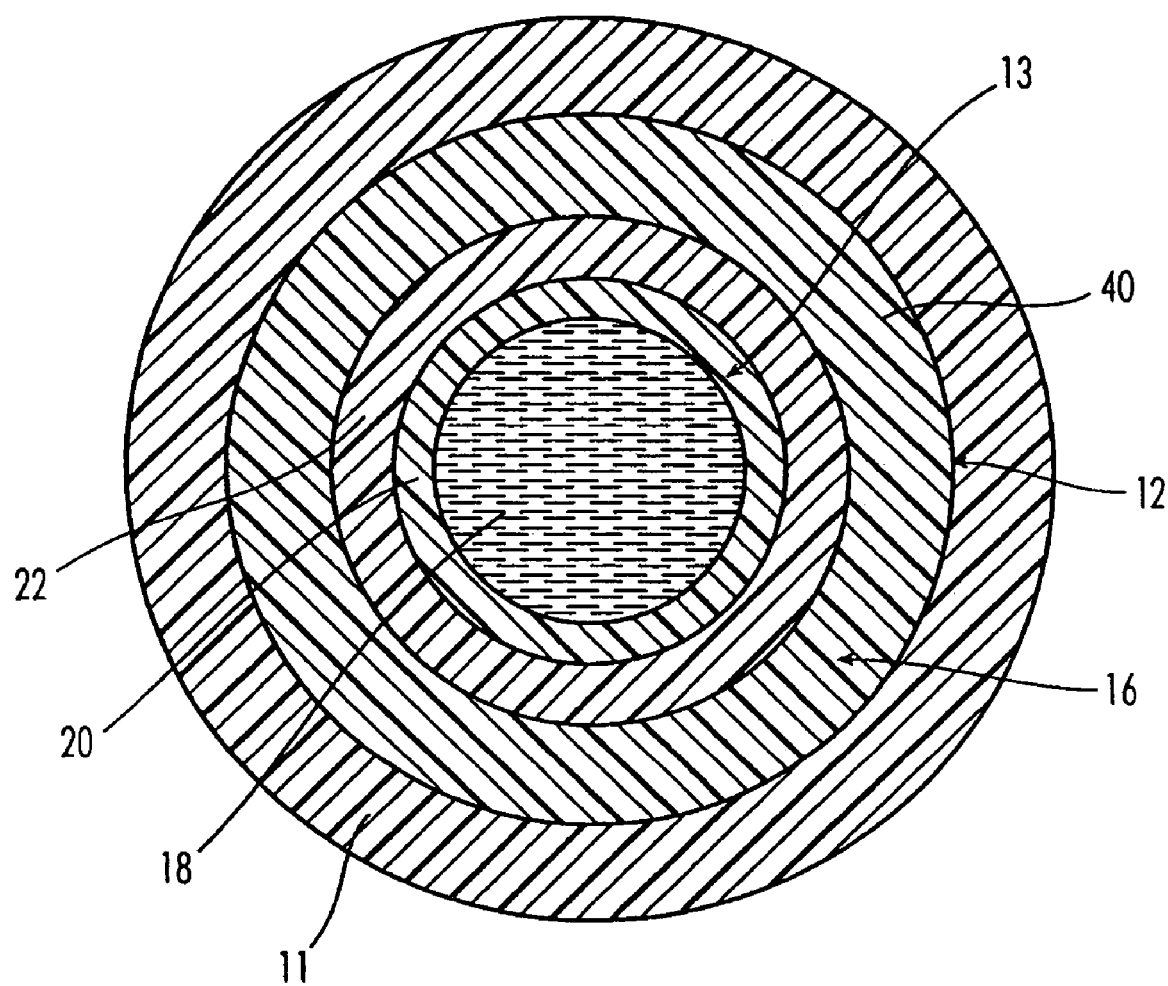
FIG. 2 is a sectional view of a ball according to the present invention with the liquid center shell and multiple mantle and cover layers around an inner sphere.
Figure 3:
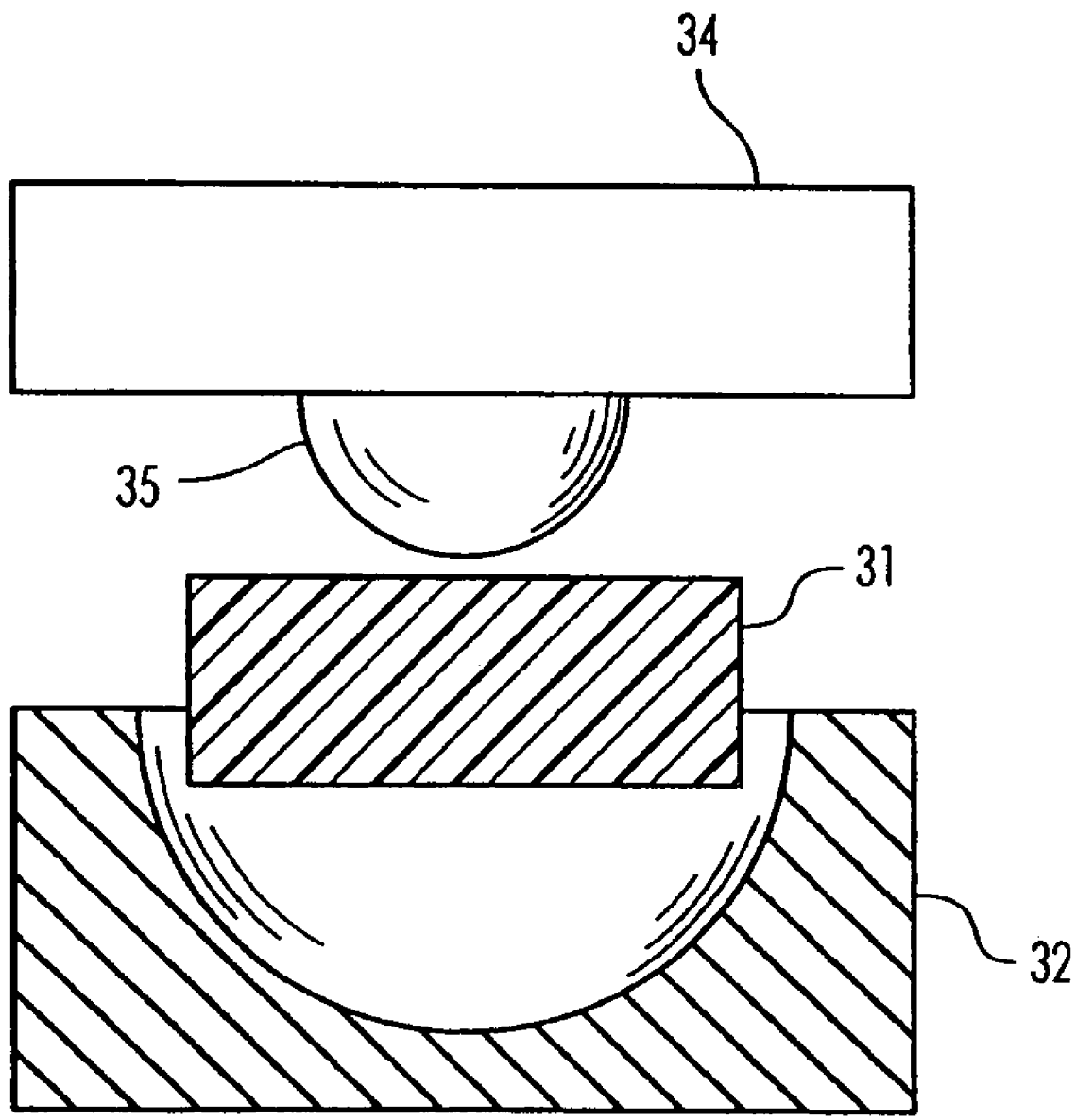
FIG. 3 is a sectional view of a mold preforming a single cup.

In one embodiment, the core 12 also has a first mantle layer 22, which surrounds the inner sphere 13. Together, the liquid center shell 20 and the first mantle layer 22 are part of a mantle portion 16 of the ball. The mantle portion 16 of FIG. 2 has an additional second mantle layer 40. The liquid center shell 20 and mantle layers 22 and 40 are preferably elastomers.

A "mantle layer" (also known as inner layer or intermediate layer) is defined herein as a portion of the golf ball that occupies a volume between the cover and the core. Such a mantle layer may be distinguished from a cover or a core by some difference between the golf ball layers, e.g., hardness, compression, thickness, and the like. A mantle layer may be used, if desired, with a multilayer cover or a multilayer core, or with both a multilayer cover and a multilayer core. Accordingly, a mantle layer is also sometimes referred to in the art as an inner cover layer, as an outer core layer or as an intermediate layer, i.e., any layer(s) disposed between the inner core and the outer cover of a golf ball, this layer may be incorporated, for example, with a single layer or a multilayer cover, with a one-piece core or a multilayer core, with both a single layer cover and core, or with both a multilayer cover and a multilayer core. As with the core, the mantle layer may also include a plurality of layers. It will be appreciated that any number or type of mantle layers may be used, as desired.

The cover 11 provides the interface between the ball 10 and a club and other objects such as trees, cart paths, and grass. Properties that are desirable for the cover are good flowability, high abrasion resistance, high tear strength, high resilience, and good mold release, among others. The golf ball can comprise one cover layer, or two or more cover layers, such as those disclosed in U.S. Pat. No. 5,885,172, the entire disclosure of which is incorporated herein by reference. For example, golf balls having multilayer covers can comprise an inner cover layer and a thin outer cover layer, wherein the outer cover layer comprises a thermoset material formed from a castable, reactive liquid and the inner cover layer comprises a high flexural modulus material. Preferably, the cover 11 is comprised of one or more layers that are injection molded, compression molded, cast or reaction injection molded.

The cover 11 can be comprised of polymeric materials such as ionic copolymers of ethylene and an unsaturated monocarboxylic acid which are available under the trademark "SURLYN®" of E.I. DuPont De Nemours & Company of Wilmington, Del. or "IOTEK®" or "ESCOR®" from Exxon of Houston, Tex. These are copolymers of ethylene and methacrylic acid or acrylic acid partially neutralized with zinc, sodium, lithium, magnesium, potassium, calcium, manganese, nickel or the like.

In accordance with the various embodiments of the present invention, the cover 11 has a thickness to generally provide sufficient strength, good performance characteristics and durability. Preferably, the cover 11 is of a thickness from about 0.015 inches to about 0.12 inches. More preferably, the cover 11 is about 0.020 to 0.09 inches in thickness and, most preferably, is about 0.025 to 0.085 inches in thickness.

In accordance with a preferred embodiment of this invention, the cover 11 can be formed from mixtures or blends of zinc, magnesium, calcium, potassium, lithium and/or sodium ionic copolymers. The SURLYN® resins for use in the cover 11 are ionic copolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include acrylic, methacrylic, crotonic, maleic, fumaric or itaconic acid.

The golf balls and components (e.g., cover layers, mantle layers, and/or core layers) encompassed by this invention can likewise be used in conjunction with homopolymeric and copolymeric materials, such as:

(1) Vinyl resins such as those formed by the polymerization of vinyl chloride, or by the copolymerization of vinyl chloride with vinyl acetate, acrylic esters or vinylidene chloride;

(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst;

(3) Polyurethanes such as those prepared from polyols and diisocyanates or polyisocyanates and those disclosed in U.S. Pat. No. 5,334,673;

(4) Polyureas such as those disclosed in U.S. Pat. No. 5,484,870;

(5) Polyamides such as poly(hexamethylene adipamide) and others prepared from diamines and dibasic acids, as well as those from amino acids such as poly(caprolactam), and blends of polyamides with SURYLN®, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics such as the urethanes, olefinic thermoplastic rubbers such as blends of polyolefins with ethylene-propylene-non-conjugated diene terpolymer, block copolymers of styrene and butadiene, isoprene or ethylene-butylene rubber, or copoly(ether-amide), such as PEBAX® sold by Atofina of Philadelphia, Pa.;

(8) Polyphenylene oxide resins, or blends of polyphenylene oxide with high impact polystyrene as sold under the trademark "NORYL®" by General Electric Company of Pittsfield, Mass.;

(9) Thermoplastic polyesters, such as polyethylene terephthalate, polybutylene terephthalate, polyethylene terephthalate/glycol modified and elastomers sold under the trademarks "HYTREL®" by E.I. DuPont De Nemours & Company of Wilmington, Del. and "LOMOD®" by General Electric Company, Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, etc. and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Additional materials may be included in the compositions of the cover layers, mantle layers, and/or core layers outlined above. For example, reaction enhancers, catalysts, coloring agents, optical brighteners, crosslinking and co-crosslinking agents, whitening agents such as $TiO_2$ and ZnO, UV absorbers, hindered amine light stabilizers, defoaming agents, processing aids, surfactants, and other conventional additives may be added to the compositions. In addition, antioxidants, stabilizers, softening agents, plasticizers, including internal and external plasticizers, impact modifiers, foaming agents, density-adjusting fillers, reinforcing materials, and compatibilizers may also be added to any of the cover and/or mantle layer compositions. One of ordinary skill in the art should be aware of the requisite amount for each type of additive to realize the benefits of that particular additive.

In a preferred embodiment, the cover 11 is comprised of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof. Still further, the cover 11 is preferably comprised of a polyether or polyester thermoplastic urethane, a thermoset polyurethane, a low modulus ionomer such as acid-containing ethylene copolymer ionomers, including E/X/Y copolymers where E is ethylene, X is an acrylate or methacrylate-based softening comonomer present in 0-50 weight percent and Y is acrylic or methacrylic acid present in 5-35 weight percent. More preferably, in a low spin rate embodiment designed for maximum distance, the acrylic or methacrylic acid is present in 15-35 weight percent, making the ionomer a high modulus ionomer. In a high spin embodiment, the acid is present in 10-15 weigh percent or a blend of a low modulus ionomer with a standard ionomer is used.

In another preferred embodiment, the cover 11 is comprised of polyurea or a polyurethane/polyurea hybrid, such as those disclosed in U.S. Pat. No. 6,835,794. The polyurea or a polyurethane/polyurea hybrid may be aliphatic, aromatic or a combination thereof. In a preferred embodiment, the cover 11 is formed from a polyurea composition including at least one light stable or saturated polyurea. Light stability may be accomplished in a variety of ways, such as by utilizing polyurea compositions that include only saturated components, i.e., saturated prepolymers and saturated curing agents, or include a light stabilizer to improve light stability when using aromatic components. The light stable or saturated polyurea includes from about 1 to about 100 weight percent of the cover, with the remainder of the cover, if any, including one or more compatible, resilient polymers such as would be known to one of ordinary skill in the art.

The polyurea compositions may be prepared from at least one isocyanate, at least one polyether amine, and at least one curing agent. Preferably the at least one curing agent is a diol or secondary diamine curing agent.

In another embodiment, the polyether or polyester thermoplastic urethane, thermoset polyurethane, polyurea, or polyurethane/polyurea hybrid is formed from an isocyanate prepolymer (also referred to herein as "isocyanate"). Any isocyanate available to one of ordinary skill in the art is suitable for use according to the invention. Isocyanates for use with the present invention include aliphatic, cycloaliphatic, aralphatic, aromatic, any derivatives thereof, and combinations of these compounds having two or more isocyanate (NCO) groups per molecule. The isocyanates may be organic polyisocyanate-terminated prepolymers, low free isocyanates, and mixtures thereof. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

The compositions of the present invention also encompass polyurethanes formed from a blend of diisocyanate prepolymers, such as those disclosed in U.S. Pat. No. 6,569,034 to Dewanjee et al, the entire disclosure of which is incorporated herein by reference. The compositions of the present invention also encompass polyurethanes formed from paraphenylene diisocyanate-based polyurethane prepolymer, as disclosed in U.S. Pat. No. 6,117,024 to Dewanjee et al, the entire disclosure of which is incorporated herein by reference.

In a preferred embodiment, the isocyanate is a saturated or unsaturated diisocyanate including, for example, diisocyanates having the generic structure: O=C=N—R—N=C=O, where R is a cyclic, aromatic, aliphatic, linear, branched, or substituted hydrocarbon moiety containing from about 1 to 20 carbon atoms, such as arylenes, aralkylenes, alkylenes, or cycloalkylenes. When multiple cyclic or aromatic groups are present, linear, branched, or substituted hydrocarbons containing from about 1 to 10 carbon atoms can be present as spacers between the cyclic or aromatic groups. In some cases, the cyclic or aromatic group(s) may be substituted at the 2-, 3-, and/or 4-positions, respectively. Substituted groups may include, but are not limited to, halogens, cyano groups, amine groups, silyl groups, hydroxyl groups, acid groups, alkoxy groups, primary, secondary, or tertiary hydrocarbon groups, or a mixture thereof.

Examples of saturated (aliphatic) diisocyanates that can be used in the polyurethane prepolymer include, but are not limited to, ethylene diisocyanate; propylene-1,2-diisocyanate; tetramethylene diisocyanate; 1,4-tetramethylene diisocyanate; 1,5-pentamethylene diisocyanate; 2-methyl-1,5-pentamethylene diisocyanate; 1,6-hexamethylene diisocyanate (HDI); HDI biuret prepared from HDI; octamethylene diisocyanate; decamethylene diisocyanate; 2,2,4-trimethylhexamethylene diisocyanate; 2,4,4-trimethylhexamethylene diisocyanate; 1,7-heptamethylene diisocyanate; 1,8-octamethylene diisocyanate; 1,9-novamethylene diisocyanate; 1,10-decamethylene diisocyanate; 1,12-dodecane diisocyanate; 1,3-cyclobutane diisocyanate; 1,2-cyclohexane diisocyanate; 1,3-cyclohexane diisocyanate; 1,4-cyclohexane diisocyanate; methylcyclohexylene diisocyanate (HTDI); 2,4-methylcyclohexane diisocyanate; 2,6-methylcyclohexane diisocyanate; 4,4'-dicyclohexane diisocyanate; 2,4'-dicyclohexane diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); saturated trimerized isocyanurates, such as isocyanurates of hexamethylene diisocyanate, isocyanurates of isophorone diisocyanate, HDI biurets prepared from HDI, isocyanurates of trimethyl-hexamethylene diisocyanate, and mixtures thereof; uretdione of hexamethylene diisocyanate, and mixtures thereof; modified polyisocyanate derived from the above isocyanates and polyisocyanates; and mixtures thereof.

Unsaturated diisocyanates, i.e., aromatic compounds, may also be used with the present invention, although the use of unsaturated compounds in the prepolymer is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI); 2,2'-, 2,4'-, and 4,4'-biphenylene diisocyanate; 3,3'-dimethyl-4,4'-biphenyl diisocyanate (TODI); 3,3'-dimethyl-4,4'-diphenylmethane diisocyanate; toluene diisocyanate (TDI); polymeric MDI (PMDI, a brown liquid composed of approximately 50% methylene diisocyanate with the remainder comprised of oligomers of MDI); carbodimide-modified liquid 4,4'-diphenylmethane diisocyanate; para-phenylene diisocyanate (PPDI); meta-phenylene diisocyanate (MPDI); ortho-phenylene diisocyanate; 4-chloro-1,3-phenylene diisocyanate; triphenylmethane-4, 4'-, and triphenylmethane-4,4"-triisocyanate; 1,5-naphthalene diisocyanate; 1,5-tetrahydronaphthalene diisocyanate; anthracene diisocyanate; tetracene diisocyanate; dimerized uretdiones of any diisocyanate or polyisocyanate, such as uretdione of toluene diisocyanate, uretdione of diphenylmethane diisocyanate, and mixtures thereof; unsaturated trimerized isocyanurates, such as trimers of diphenylmethane diisocyanate, trimers of tetramethylxylene diisocyanate, isocyanurates of toluene diisocyanate, and mixtures thereof; monomeric triisocyanates such as 2,4,4'-diphenylene triisocyanate, 2,4,4'-diphenylmethane triisocyanate, 4,4',4"-triphenylmethane triisocyanate, and mixtures thereof; and mixtures thereof.

Any polyether amine available to one of ordinary skill in the art is suitable for use according to the invention. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

The polyurea composition can be formed by crosslinking the polyurea prepolymer with a blend or mixture of curing agents. Curing agents for use with the present invention include, but are not limited to, hydroxy terminated curing agents, amine-terminated curing agents, and mixtures thereof. In one preferred embodiment, the curing agents are amine-terminated curing agents, and more preferably secondary diamine curing agents. If desired, however, the polyurea composition may be formed with a single curing agent. Polyurea prepolymers cured with a secondary diamine with 1:1 stoichiometry in the absence of moisture are thermoplastic in nature, while thermoset polyurea compositions, on the other hand, are generally produced from a polyurea prepolymer cured with a primary diamine or polyfunctional glycol.

The use of light stabilizing components also may assist in preventing cover surface fractures due to photodegredation. Suitable UV absorbers and light stabilizers include, but are not limited to, TINUVIN® 292, TINUVIN® 328, TINUVIN® 213, TINUVIN® 765, TINUVIN® 770 and TINUVIN® 622. The preferred UV absorber for aromatic compounds is TINUVIN® 328, and the preferred hindered amine light stabilizer is TINUVIN® 765. A preferred light stabilizer for the saturated (aliphatic) compounds is TINUVIN® 292. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

The compositions of the present invention may be selected from among both castable thermoset and thermoplastic materials, which is determined by the curing agent used to cure the prepolymer. For example, castable thermoplastic compositions of the invention include linear polymers and are typically formed curing the prepolymer with a diol or secondary diamine. Thermoset compositions of the invention, on the other hand, are cross-linked polymers and are typically produced from the reaction of a diisocyanate and a polyol cured with a primary diamine or polyfunctional glycol.

The polyurea compositions preferably include from about 1 percent to about 100 percent polyurea, however, the polyurea compositions may be blended with other materials. In one embodiment, the composition contains about 10 percent to about 90 percent polyurea, preferably from about 10 percent to about 75 percent polyurea, and contains about 90 percent to 10 percent, more preferably from about 90 percent to about 25 percent other polymers and/or other materials as described below.

Other polymeric materials suitable for blending with the compositions of the invention include castable thermoplastic or thermoset polyurethanes, cationic and anionic urethane ionomers and urethane epoxies, polyurethane/polyurea ionomers, epoxy resins, polyethylenes, polyamides and polyesters, polycarbonates, polyacrylin, and mixtures thereof. Examples of suitable urethane ionomers are disclosed in U.S. Pat. No. 5,692,974, the entire disclosure of which is incorporated by reference herein. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870, the entire disclosure of which is incorporated by reference herein. In particular, the polyureas of U.S. Pat. No. 5,484,870 are prepared by reacting a polyisocyanate and a polyamine curing agent to yield polyurea, which are distinct from the polyureas mentioned above, which are formed from a polyurea prepolymer and curing agent. Examples of suitable polyurethanes cured with epoxy group containing curing agents are disclosed in U.S. Pat. No. 5,908,358, the entire disclosure of which is incorporated by reference herein.

Thus in a preferred embodiment, polyurea compositions are blended with polyurethane to form a polyurea/polyurethane hybrid. Polyurethanes suitable for use in the invention are the product of a reaction between at least one polyurethane prepolymer and at least one curing agent. The polyurethanes used in the compositions of the present invention may be selected from among both castable thermoset and thermoplastic polyurethanes. Thermoplastic polyurethanes are linear polymers and are typically formed from the reaction of a diisocyanate and a polyol cured with a diol or a secondary diamine with 1:1 stoichiometry in the absence of moisture. Thermoset polyurethanes, on the other hand, are crosslinked polymers and are typically produced from the reaction of a diisocyanate and a polyol cured with a primary diamine or polyfunctional glycol.

Additionally, suitable cover materials include a nucleated reaction injection molded polyurethane, polyurea or polyurea/polyurethane hybrids, where a gas, typically an inert or non-reactive gas such as nitrogen, argon, helium and air, is essentially vigorously mixed into at least one component of the polyurethane, typically, the pre-polymer, prior to component injection into a closed mold where full reaction takes place resulting in a cured polymer having reduced specific gravity. The materials are referred to as reaction injection molded ("RIM") materials. Examples of RIM materials, as well as the RIM process, are disclosed in U.S. Pat. Nos. 6,548,618, 6,533,566 and 6,290,614, the entire disclosures of which are incorporated herein by reference.

In the mantle portion 16, the liquid center shell 20, and first and second mantle layers 22 and 40 are preferably made of elastomers, such as thermoset rubber, including polyisoprene, styrene butadiene, polybutadiene and combinations thereof; plastic, such as polypropylene; or thermoplastic elastomeric material such as copolymers of methyl-methacrylate with butadiene and styrene, copolymers of methyl-acrylate with butadiene and styrene, acrylonitrile styrene copolymers, polyether-ester, polyether-amide, polyurethane and/or blends thereof. Most preferably, the first and second mantle layers 22 and 40 are made of thermoset rubber or thermoplastic elastomeric materials.

In another embodiment, highly-neutralized polymers ("HNP's") and blends thereof, such as those described in U.S. patent application Ser. No. 10/118,719, filed Apr. 9, 2002, now U.S. Pat. No. 6,756,436, and U.S. patent application Ser. No. 10/959,751, filed Oct. 6, 2004, now U.S. Publication No. 2005/0049367, the entire disclosures of which are incorporated by reference herein, as well as low melting thermoplastics, may be used in ball cores, mantle layers, and/or covers. HNP's include polymers containing one or more acid groups that are neutralized by an organic acid or a salt thereof. In a preferred embodiment, the first and second mantle layers 22 and 40 are made of such highly-neutralized polymers and/or low melting thermoplastics. In one embodiment, the low melting thermoplastics have a resilience of a thermoset rubber. For example, such low melting thermoplastics having a resilience of a thermoset rubber include, but are not limited to, HNP's and blends of HNP's with compatible thermoplastics, such as partially or fully neutralized ionomers including those neutralized by a metal ion source wherein the metal ion is the salt of an organic acid, polyolefins including polyethylene, polypropylene, polybutylene, and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethylene-acrylic acid-methyl acrylate, polyethylene ethyl or methyl acrylate, polyethylene vinyl acetate, polyethylene glycidyl alkyl acrylates).

The acid moieties of the HNP's, typically ethylene-based ionomers, are neutralized greater than about 70%, preferably greater than about 80%, more preferably greater than about 90%, and most preferably at least about 100%. The HNP's can be also be blended with a second polymer component, which, if containing an acid group, may be neutralized in a conventional manner, by the organic fatty acids, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment, the organic acid is selected from the group consisting of aliphatic organic acids, aromatic organic acids, saturated mono-functional organic acids, unsaturated mono-functional organic acids, and multi-unsaturated mono-functional organic acids. Preferably, the salt of organic acids comprise the salts of barium, lithium, sodium, zinc, bismuth, chromium, cobalt, copper, potassium, strontium, titanium, tungsten, magnesium, cesium, iron, nickel, silver, aluminum, tin, calcium, stearic, behenic, erucic, oleic, linoelic, dimerized derivatives, and mixtures thereof.

Additionally, HNP's, such as those described in U.S. application Ser. No. 11/270,066, filed Nov. 9, 2005, the entire disclosure of which is incorporated by reference herein, may be used in the ball cores, mantle layers and/or covers. For example, it has been found that when an acid polymer or a partially neutralized acid polymer is neutralized to 70% or higher using a cation source which is less hydrophilic than magnesium-based cation sources traditionally used to produce HNPs, the resulting inventive HNP provides for compositions having improved moisture vapor transmission properties. For example, a polymer composition comprising an HNP, wherein the HNP is produced using a less hydrophilic cation source, can have a moisture vapor transmission rate of 8 g-mil/100 in$^2$/day or less, or 5 g-mil/100 in$^2$/day or less, or 3 g-mil/100 in$^2$/day or less, or 2 g-mil/100 in$^2$/day or less, or 1 g-mil/100 in$^2$/day or less, or less than 1 g-mil/100 in$^2$/day. As used herein, moisture vapor transmission rate (MVTR) is given in g-mil/100 in$^2$/day, and is measured at 20° C., and according to ASTM F1249-99.

"Less hydrophilic" is used herein to refer to cation sources which are less hydrophilic than conventional magnesium-based cation sources. Examples of suitable less hydrophilic cation sources include, but are not limited to, silicone, silane, and silicate derivatives and complex ligands; metal ions and compounds of rare earth elements; and less hydrophilic metal ions and compounds of alkali metals, alkaline earth metals, and transition metals; and combinations thereof. Particular less hydrophilic cation sources include, but are not limited to, metal ions and compounds of potassium, cesium, calcium, barium, manganese, copper, zinc, tin, and rare earth metals. Potassium-based compounds are a preferred less hydrophilic cation source, and particularly Oxone®, commercially available from E.I. du Pont de Nemours and Company. Oxone® is a monopersulfate compound wherein potassium monopersulfate is the active ingredient present as a component of a triple salt of the formula $2KHSO_5 \cdot KHSO_4 \cdot K_2SO_4$ [potassium hydrogen peroxymonosulfate sulfate (5:3:2:2)]. The amount of less hydrophilic cation source used is readily determined based on the desired level of neutralization.

In one embodiment, the first and second mantle layers 22 and 40 each independently can include a crosslinker, such as a metal salt of unsaturated carboxylic acid. In particular, the metal salt of unsaturated carboxylic acid is blended as a co-crosslinking agent in at least one of the first and second mantle layer 22 and 40. Examples include magnesium, calcium, zinc, aluminum, sodium, lithium, or nickel salts of unsaturated fatty acids having 3 to 8 carbon atoms, such as acrylic acid, methacrylic acid, maleic acid, and fumaric acid, with the zinc salts of acrylic and methacrylic acid being most preferred. Preferred metal salts of unsaturated fatty acids include zinc acrylate, zinc diacrylate, zinc methacrylate, zinc dimethacrylate, and mixtures thereof. The unsaturated carboxylic acid metal salt may be blended in a rubber either as a preformed metal salt or by introducing an a,β-unsaturated carboxylic acid and a metal oxide or hydroxide into the rubber composition and allowing them to react in the rubber composition to form a metal salt. The unsaturated carboxylic acid metal salt may be blended in any desired amount, but preferably in amounts of about 25 to about 40 parts and more preferably between about 30 to about 35 by weight per 100 parts by weight of the base rubber.

The composition of the first or second mantle layer (22 or 40) may also contain an organosulfur compound or a metal salt thereof in addition to the base rubber and the unsaturated carboxylic acid metal salt, such as those disclosed in U.S. patent application Ser. No. 09/951,963 (now U.S. Pat. No. 6,635,716), the entirety of which is incorporated herein by reference. The addition of such organosulfur compounds to base rubber compositions exhibit increased COR, decreased compression, or both. The organosulfur compound or metal salt thereof is preferably a halogenated organosulfur compound, and more preferably a halogenated thiophenol, including, but not limited to, pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5- fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol and; and their zinc salts. Preferably, the halogenated thiophenol is pentachlorothiophenol ("PCTP"), which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol is the zinc salt of pentachlorothiophenol, which is commercially available from eChinachem of San Francisco, Calif. The organosulfur compounds of the present invention are present in any amount, preferably in an amount greater than about 2 parts or less than 40 parts by weight per 100 parts of base rubber ("pph"). In one embodiment, the organosulfur compound is present between about 2.2 pph and about 30 pph, and preferably between about 2.3 and about 20 pph. In another embodiment, the organosulfur compound is present from about 2.5 pph to about 15 pph, preferably between about 5 pph to about 10 pph. The upper and lower limits of the ranges disclosed herein are interchangeable to form new ranges. For example, the amount of organosulfur compound may be present between about 2.2 pph to about 15, or between about 10 pph and about 40 pph, or between about 2 pph to about 5 pph.

The composition of the first or second mantle layer (20 or 40) may further contain a co-crosslinking initiator. Preferred examples of the co-crosslinking initiator include organic peroxides, such as dicumyl peroxide, t-butylperoxybenzoate, di-t-butylperoxide, 1,1-bis(t-butylperoxy)-3,3,5 trimethylcyclohexane, n-butyl-4,4-bis(t-butylperoxy)valerate, 2,2,-bis(t-butylperoxy-isopropyl)benzene, and 2,5-dimethyl-2,5-di(t-butylperoxy)hexene, with the dicumyl peroxide being most preferred. The initiator may be blended in amounts of about 0.5 to about 3 parts by weight, preferably about 1 to about 2.5 parts by weight per 100 parts by weight of the base rubber.

A composite or metal layer may also be utilized for the first or second mantle layer (22 or 40) as described in U.S. Pat. No. 6,899,642, the entire disclosure of which is incorporated by reference herein. For example, the composite material may include a filament material embedded in a matrix or binder material.

The filament material may be a single fiber or formed of more than one fiber or a plurality of fibers (i.e., multi-fiber tow or bundle). The filament material may be formed of fibers of polymeric materials, glass materials, or metal fibers, among others. The filament material may also be comprised of strands or fibers having different physical properties to achieve desired stretch and elongation characteristics. The matrix material may be molded about the filament material so that the filament material is embedded in the matrix material, as discussed above. The matrix material may be a thermoset or a thermoplastic polymer. Preferred thermoset polymeric materials are, for example, unsaturated polyester resins, vinyl esters, epoxy resins, phenolic resins, polyurethanes, polyurea, polyimide resins, and polybutadiene resins. Preferred thermoplastics are, for example, polyethylene, polystyrene, polypropylene, thermoplastic polyesters, acrylonitrile butadiene styrene (ABS), acetal, polyamides including semicrystalline polyamide, polycarbonate (PC), shape memory polymers, polyvinyl chloride (PVC), polyurethane, trans-polybutadiene, liquid crystalline polymers, polyether ketone (PEEK), bio(maleimide), and polysulfone resins.

The matrix material can also be a silicone material, such as a silicone polymer, a silicone elastomer, a silicone rubber, silicone resins, or a low molecular weight silicone fluid, thermoplastic silicone urethane copolymers and variations, and the likes.

In one embodiment, preferably, the first mantle layer 22 is comprised of polybutadiene material that has high specific gravity for a low spin rate ball and a low specific gravity for a high spin rate ball. The specific gravity of the polybutadiene material can be varied by adding fillers known to those skilled in the art.

In another embodiment, the mantle portion 16 is relatively thick and is comprised of a highly neutralized ionomer or a crosslinked polybutadiene rubber.

In one embodiment, the mantle portion 16 preferably has an outside diameter d3 in the range of 80 to 98% of the finished ball diameter D and an inner diameter d1 in the range of 30 to 70% of the finished ball diameter. Preferably, mantle portion 16 and the liquid center shell 20 have an inner diameter of approximately 0.5 to 1.18 inches and, more preferably, an inner diameter of approximately 0.75 to 1.1 inches. Preferably, the mantle portion 16 and liquid center shell 20 have an inner diameter of approximately 0.9 to 0.95 inches. The first mantle layer 22 preferably has an inner diameter d2 in the range of 0.55 to 1.45 inches and, more preferably, approximately 0.8 to 1.3 inches. Yet further still, the mantle portion 16 has an outside diameter d3 in the range of 1.3 to 1.65 inches and, more preferably, approximately 1.45 to 1.62 inches.

In another embodiment, preferably, the mantle portion 16 and the liquid center shell 20 have an inner diameter d1 of approximately 0.25 to 1.5 inches and, more preferably, an inner diameter of approximately 0.5 to 1.35 inches. Preferably, the mantle portion 16 and the liquid center shell 20 have an inner diameter of approximately 0.65 to 1.25 inches. The mantle portion 16 preferably has a thickness of 0.04 to 0.35 inches, and more preferably 0.07 to 0.3 inches and may comprise one or more layers or plys of the same or different materials.

A golf ball incorporating these measurements can be designed with the various attributes discussed below, such as specific gravity, resiliency and hardness, to provide the desired playing characteristics, such as spin rate and initial velocity. More particularly, by using a liquid center shell to surround the fluid center, in an inner sphere, and at least a first mantle layer, the specific gravities and other properties can be tailored to provide optimum playing characteristics. More particularly, by constructing a ball according to these dimensions, the first mantle layer 22 is made with a significant volume compared to the fluid center 18. Preferably, the volume of the first mantle layer 22 is greater than the volume of the fluid center 18. More preferably, the volume of the first layer 22 is about 2 to 4 times the volume of the fluid center 18.

Thus, the properties of the first mantle layer can effect the playing characteristics of the ball.

The hardness and resiliency of the mantle portion 16 can be varied to achieve certain desired parameters such as spin rate, compression and initial velocity.

Preferably, the mantle portion 16 has a hardness of approximately 30 to 95 Shore C, and more preferably, 45 to 90 Shore C. Still further, the mantle portion 16 has a resiliency greater than 40 Bashore.

In a most preferred embodiment, the liquid center shell 20 is comprised of a plastic material having high temperature resistance, such as those disclosed in U.S. patent application Ser. No. 10/008,013, filed Nov. 13, 2001, now U.S. Pat. No. 6,616,549. In particular, the liquid center shell 20 and/or the first mantle layer 22 comprises dynamically vulcanized thermoplastic elastomer; functionalized styrene-butadiene elastomer; thermoplastic polyurethane; thermoplastic polyetherester or polyetheramide; thermoplastic ionomer resin; fluoropolymers, such as perfluoroalkylenes (e.g., polytetrafluoroethylene, polyhexafluoropropylene), and functionalized fluoropolymer resins that are sulfonated, carboxylated, epoxidized, maleated, amined or hydroxylized as disclosed in U.S. Pat. No. 5,962,140, the entirety of which is incorporated by reference herein; thermoplastic polyester; metallocene polymer or blends thereof and/or thermoset materials.

It will be appreciated that the wall material may be any material known the in art, including thermoplastic-ionomer, polypropylene, polyethylene, acid copolymer, polyolefin, polyurea, metallocene catalyzed polyolefinic copolymers, polyvinyl chloride, polytetra fluoro ethylene, polyester elastomer, polyamide elastomer, polycarbonate, polyester, styrene-butadiene and SEBS block copolymers, silicone or thermoset crosslinked diene rubbers, including butyl rubber, natural rubber, and acrylonitrile.

Suitable dynamically vulcanized thermoplastic elastomers include SANTOPRENE®, SARLINK®, VYRAM®, DYTRON® and VISTAFLEX®. SANTOPRENE® is the trademark for a dynamically vulcanized PP/EPDM (polypropylene/ethylene-propylene-diene rubber). SANTOPRENE® 203-40 is an example of a preferred SANTORPENE® and is commercially available from Advanced Elastomer Systems, Akron, Ohio. Examples of suitable functionalized styrene-butadiene elastomers include KRATON® FG-1901x and KRATON® FG-1921x, which are available from the Shell Corporation. Examples of suitable thermoplastic polyurethanes include ESTANE® 58133, ESTANE® 58134 and ESTANE® 58144, which are commercially available from the B.F. Goodrich Company. Suitable metallocene polymers whose melting points are higher than the cover materials can also be employed in the mantle layer of the present invention. Further, the materials for the mantle layer described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass.

Suitable thermoplastic polyetheresters include HYTREL® 3078, HYTREL® 3548, HYTREL® 4078, HYTREL® 4069, HYTREL® 6356, HYTREL® 7246, and HYTREL® 8238 which are commercially available from DuPont, Wilmington, Del. Suitable thermoplastic polyetheramides include PEBAX® 2533, PEBAX® 3533, PEBAX® 4033, PEBAX® 5533, PEBAX® 6333, and PEBAX® 7033 which are available from Atofina, Philadelphia, Pa. Suitable thermoplastic ionomer resins include any number of olefinic based ionomers including SURLYN® and IOTEK®, which are commercially available from DuPont and Exxon, respectively. The flexural moduli for these ionomers are about 1000 psi to about 200,000 psi. Suitable thermoplastic polyesters include polybutylene terephthalate. Likewise, the dynamically vulcanized thermoplastic elastomers, functionalized styrene-butadiene elastomers, thermoplastic polyurethane or metallocene polymers identified above are also useful as the second thermoplastic in such blends. Further, the materials of the second thermoplastic described above may be in the form of a foamed polymeric material.

Preferably, the shell 20 is a thin layer of a polyolefin, ionomer or acid copolymer. Alternatively, the shell 20 may be made of a conventional wound envelope material. In yet another embodiment, the shell 20 material may include a HNP material, as described above. Preferably, this HNP would be selected from those disclosed in U.S. application Ser. No. 11/270,066, filed Nov. 9, 2005, the entire disclosure of which previously was incorporated by reference herein.

Figure 12:
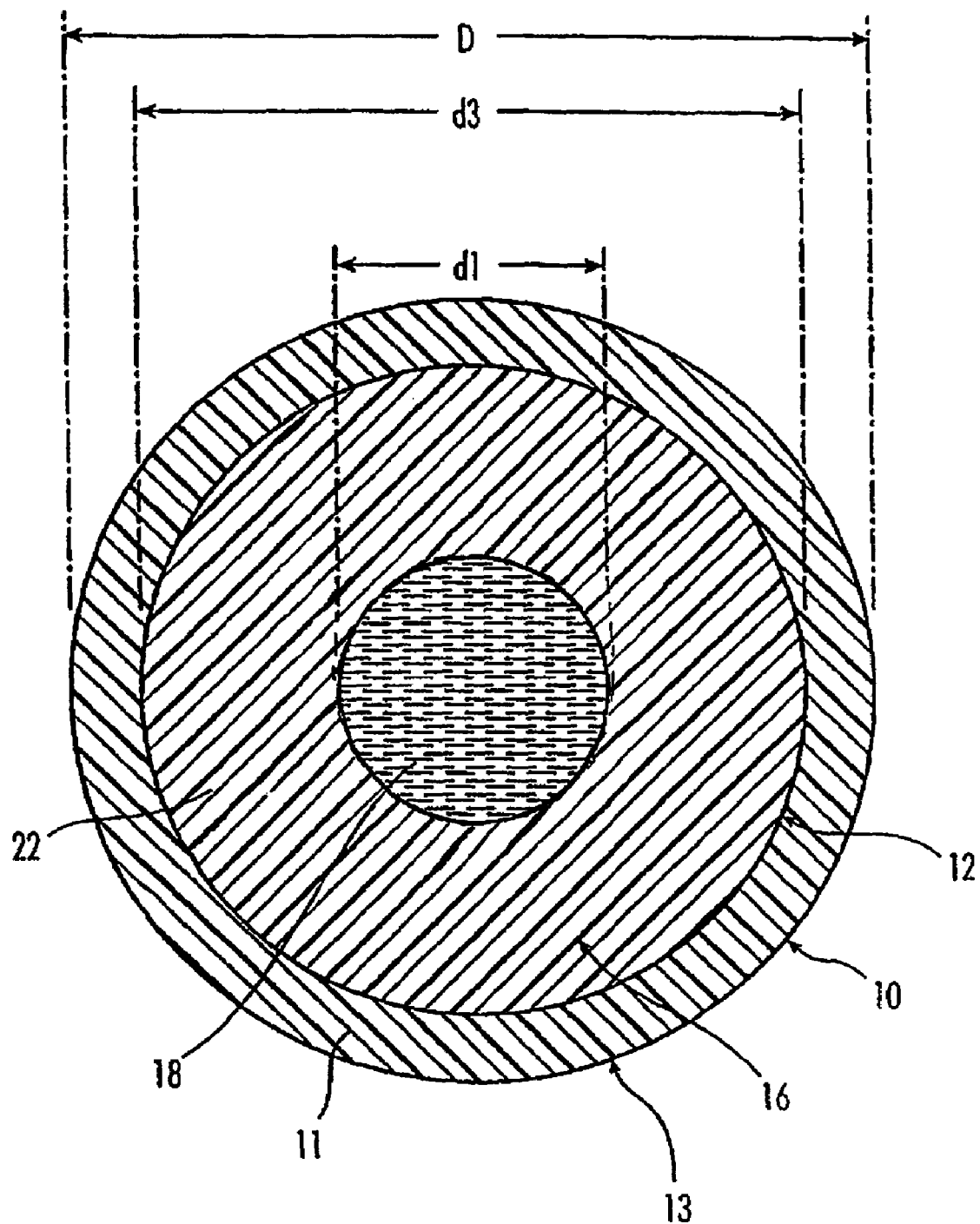
FIG. 12 is a sectional view of a ball according to another embodiment of the invention.

As illustrated in FIG. 12, the fluid center 18 may be enclosed by the mantle portion 16, without a shell 20. One or more cover layers may enclose the mantle portion 16 as described above. It will be appreciated that the mantle portion 16 may be comprised of one or more plys of the same or different materials. The fluid center 18 has a diameter d1 of approximately 0.25 to 1.5 inches and, more preferably, a diameter of approximately 0.5 to 1.35 inches. The mantle portion 16 preferably has a thickness of 0.4 to 0.8 inches, and more preferably 0.4 to 0.56 inches. The mantle portion 16 has an outside diameter d3 in the range of 1.3 to 1.65 inches and, more preferably, approximately 1.45 to 1.62 inches. The mantle portion may be made of any material discussed previously. Preferably, the mantle portion 16 comprises HNP. Preferably, this HNP would be selected from those disclosed in U.S. application Ser. No. 11/270,066, filed Nov. 9, 2005, the entire disclosure of which previously was incorporated by reference herein.

The fluid center 18 can be a wide variety of materials or fluids, including solutions and gases, as well as liquids having low coefficient of thermal expansion and/or high boiling points. In particular, the fluid center 18 may be comprised of a gas (and may be pressurized and/or non-reactive), such as air, nitrogen, helium, argon, neon, carbon dioxide, nitrous oxide and mixtures thereof; water; polyols, such as glycerine, ethylene glycol and the like; paste; foams; oils; water solutions, such as salt in water, corn syrup, salt in water and corn syrup, or glycol and water; or mixtures thereof. The fluid can also include pastes, colloidal suspensions, such as clay, barytes, carbon black in water or other liquid, or salt in water/glycol mixtures; gels, such as gelatin gels, hydrogels, water/methyl cellulose gels and gels comprised of copolymer rubber based materials such a styrene-butadiene-styrene rubber and paraffinic and/or naphthenic oil; or melts including waxes and hot melts. Hot-melts are materials which at or about normal room temperatures are solid but at elevated temperatures become liquid. The fluid center 18 can also be a reactive liquid system which combine to form a solid. Examples of suitable reactive liquids are silicate gels, agar gels, peroxide cured polyester resins, two part epoxy resin systems and peroxide cured liquid polybutadiene rubber compositions. It is understood by one skilled in the art that other reactive liquid systems can likewise be utilized depending on the physical properties of the liquid center shell and the physical properties desired in the resulting finished golf balls. U.S. Pat. Nos. 6,200,230, 5,683,312, and 5,150,906 contain disclosures of preferred liquids for use in the shell 20, and their entire disclosures are incorporated by reference herein.

The fluid center 18 can be varied to modify the performance parameters of the ball, such as the moment of inertia. Preferably, the fluid center 18 is comprised of a material that has a high specific gravity for high spin rate golf balls and a material that has a low specific gravity for a low spin rate golf ball. Preferably, the specific gravity of the fluid is below or equal to 1.2 for low specific gravity centers and above 1.2 for high specific gravity centers. Preferably, the specific gravity is approximately 0.90-1.2, more preferably 1.15-1.2 for low specific gravity centers and approximately 1.21-1.70, and more preferably 1.3-1.55 for high specific gravity centers. Still further, the fluid is preferably comprised of a material with a low viscosity for a golf ball having a high spin rate and a material having a high viscosity for a golf ball having a low spin rate. Preferably, the viscosity of the fluid center 18 is less than 100 cps for low viscosity centers and greater than or equal to 100 cps for high viscosity centers. More preferably, the viscosity of the fluid center 18 is less than or equal to 10 cps for low viscosity centers and is between 100 and 1500 cps for high viscosity centers. Most preferably, the fluid center 18 viscosity is approximately 500 cps for high viscosity centers.

The core 12 is preferably 60 to 95% of the total ball weight and more preferably, 75 to 86% of the ball weight. As stated above, the weight distribution within the core 12 can be varied to achieve certain desired parameters such as spin rate, compression and initial velocity.

For example, by increasing the diameter of the fluid center 18, and increasing the specific gravity of the mantle portion 16, the weight distribution of the core 12 is moved toward the outer diameter for a lower spin rate ball. In contrast, the diameter of the fluid center 18 can be decreased and the specific gravity of the mantle layer 16 decreased to move the weight distribution of the ball towards the ball center for a high spin rate ball.

Similarly, the specific gravity of the fluid center 18 can be decreased and the specific gravity of the mantle portion 16 increased for a low spin rate ball. Alternatively, the specific gravity of the fluid center 18 can be increased and the specific gravity of the mantle portion 16 decreased for a high spin rate ball.

Optionally, the core may have an inner surface of the shell 20 that is modified to increase surface area and thereby change the rate of spin decay by altering the decoupling of the liquid from the shell wall at some point following impact, as described in U.S. Pat. No. 6,238,304, the entire disclosure of which is incorporated by reference herein. The modified inner surface allows modification of the fluid dynamic properties in the liquid filled center by a means other then changing the type of fluid filling in the core. More particularly, this includes use of a modified inner surface of the shell. Frictional drag between the shell and fluid is adjusted by modification of the inner surface next to the fluid.

Many techniques may be used to modify the frictional drag of the fluid inside the liquid center shell. A texture may be added to the inner surface of the shell. The texture could be in the form of dimples, nubs, paddles or fingers extending into the center of the core of the golf ball or grooves cut or molded into the inner surface of the shell. Individual textures can themselves be modified by increasing or decreasing their size or depth, or alternating their placement or number. Further, protrusions of varying sizes or shapes could be used on the inner surface of the shell.

Figure 13A:
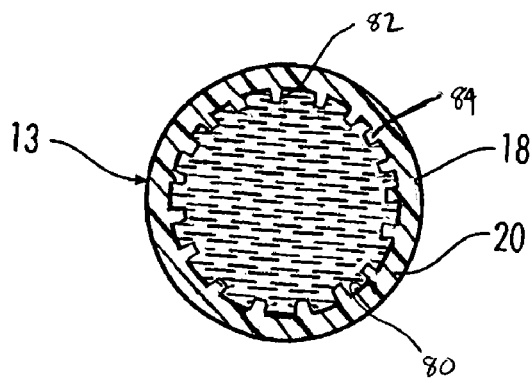
FIGS. 13A-13D are sectional views of the liquid centers of balls according to embodiments of the invention having an inner surface that is modified with an increased surface area.
Figure 13B:
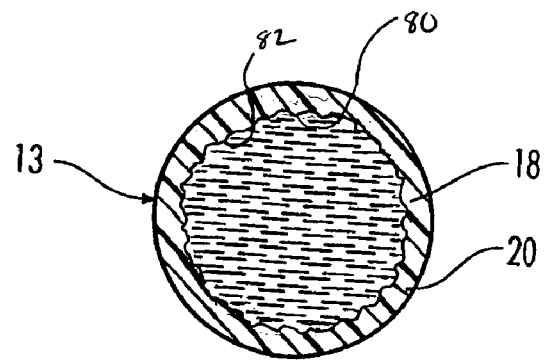
Figure 13C:
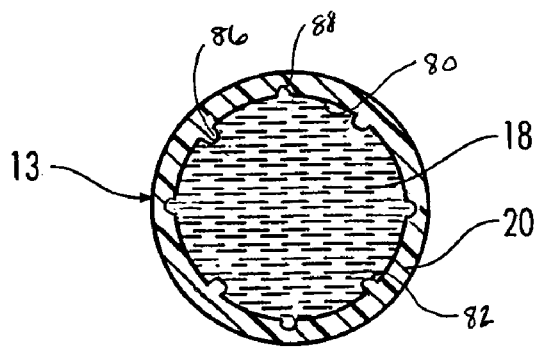
Figure 13D:
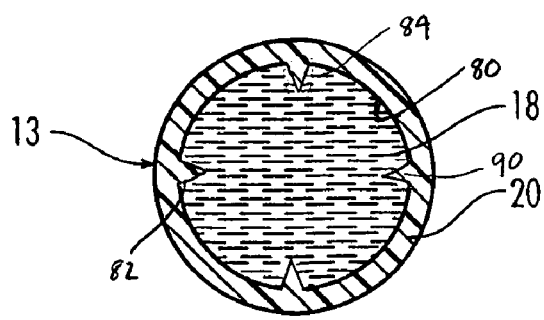

FIGS. 13A-D illustrate examples of shells 20 having modified inner surfaces. The shells 20 have an inner surface 80 with a texture 82 added. For example, in FIG. 13A, protrusions 84 are provided on the inner surface 80 of the shell 20 to increase the surface area. These protrusions 84 are shown being regularly shaped, sized and spaced. It will be appreciated that one or more of the shape, size and spacing of the protrusions may be varied. In FIG. 13B, the inner surface 80 of the shell 20 has been modified to a wavy surface to increase the surface area. The wavy surface may be regular or irregular. FIG. 13C illustrates the inner surface 80 of the shell 20 having both projections 86 and dimples 88 on the inner surface 80 to increase the surface area. Finally, in FIG. 13D, the protrusions 84 are shown to be triangular protrusions that extend from the inner surface 80 of the shell 20. It will be appreciated that numerous variations will be apparent to one of skill in the art. Additionally, it will be appreciated that although these modified inner surfaces 80 are illustrated on the shell 20, they could be provided on the inner surface of any other layer provided adjacent the fluid center 18.

The modified inner surface of the shell may be used to modify the spin decay during the balls flight. Preferably, the rate of spin decay is greater than 4% of initial spin, more preferably at least 10% of initial spin, and still more preferably at least 15% of initial spin. The rate of spin decay is preferably the rate of spin decay over the entire ball flight. For example, if a golf ball has an initial spin rate of 3500 rpm, a spin decay of 10% of initial spin will result in a spin rate of 3150 rpm at the end of the ball's flight.

FIGS. 14A-D illustrate the slope of a regression line quantifying the rate of spin decay during the first 0.4 seconds of a ball's flight and compare it to a similar regression quantifying the rate of spin decay for the complete ball flight. Golf ball spin rate decay measurements were taken on shots hit by a skilled human golfer. Measurements were made on two wound, liquid center construction balls (Titleist Tour Balata and Titleist Tour Professional), known in the prior art for their spin decay properties. These constructions are compared to the Titleist ProV1x, a modern solid construction ball known to feature a different spin decay profile than a liquid center ball. Data was acquired by means of a "Trackman", a proprietary phased array radar golf ball tracking device manufactured by ISG Denmark (www.isg.dk). This tracking device has recently been used for in-tournament player data acquisition by the USGA (http://www.usopen.com/2005/news/test_center.html). Among other data, Trackman provides continual real-time measurements of golf ball spin rate throughout the ball's flight. With this information, a golf ball's spin rate can be plotted as a function of flight time and comparative measurements of downrange spin performance can be evaluated.

Figure 14B:
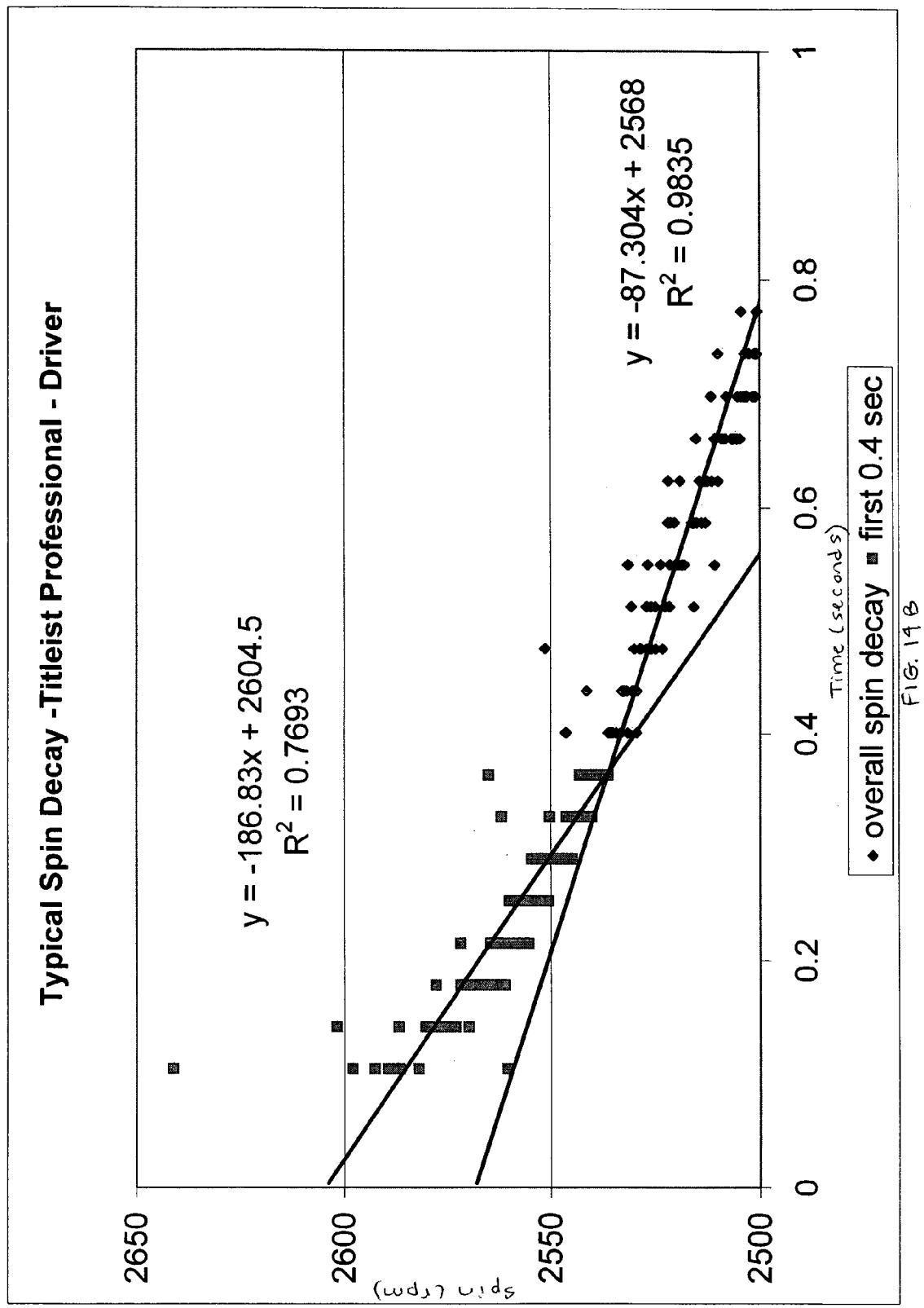

As shown in FIGS. 14A and 14B, the spin decay for a Titleist Professional golf ball hit by a driver is illustrated. As discussed above, the Titleist Professional has a wound construction with a liquid center. This golf ball results in a regression line for the first 0.4 seconds of flight having a slope of −186.83, while for the whole flight the regression line has a slope of −87.304. Thus, the difference in slope for the two regression lines is about 100 units.

Figure 14C:
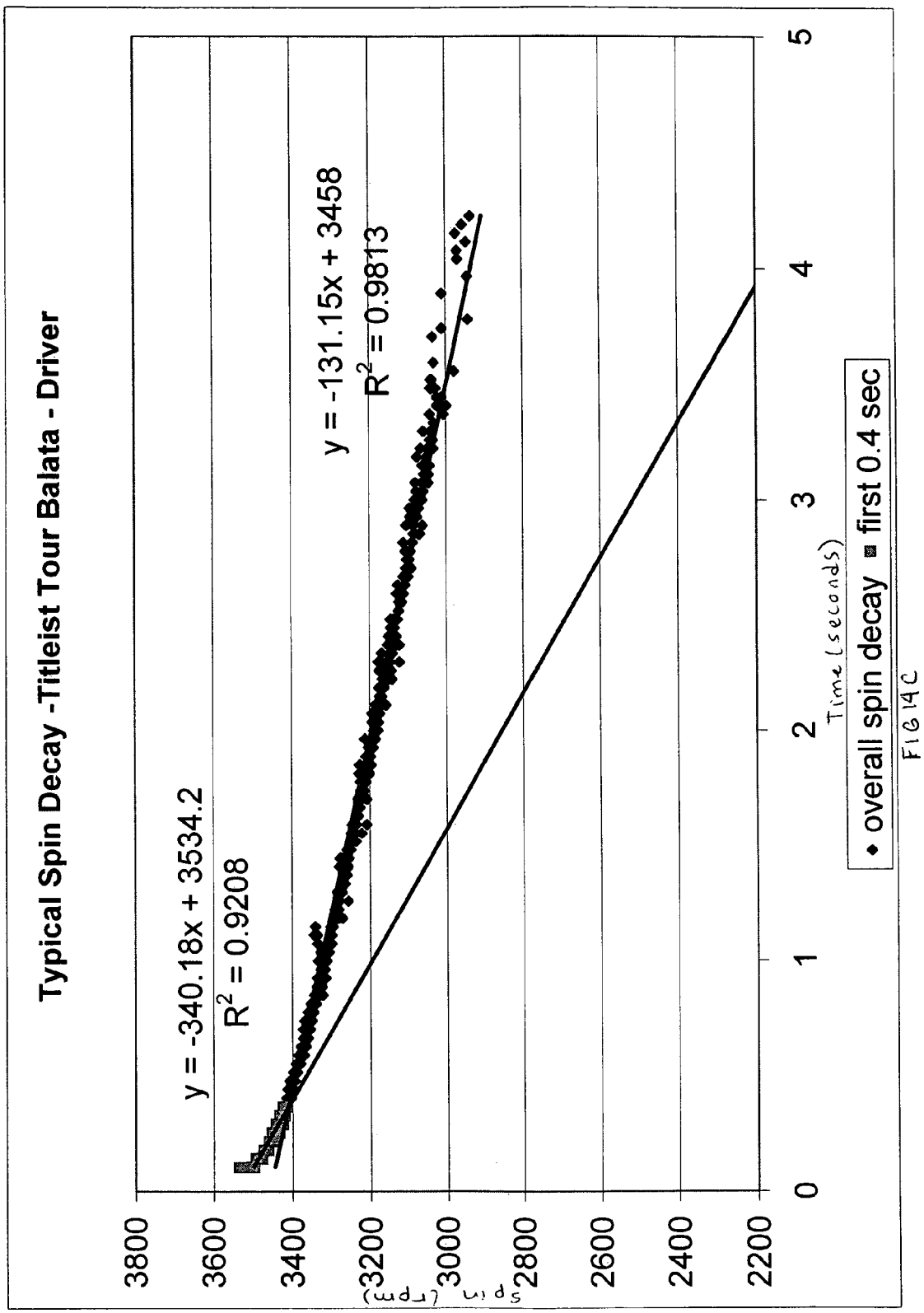

Referring now to FIG. 14C, the spin decay for a Titleist Tour Balata golf ball hit by a driver is illustrated. As discussed above, the Titleist Tour Balata also has a wound construction with a liquid center. This golf ball results in a regression line for the first 0.4 seconds of flight having a slope of −340.18, while the regression line for the whole flight has a slope of about −131.15. Thus, the difference in slope for the two regression lines is about 200 units.

Figure 14D:
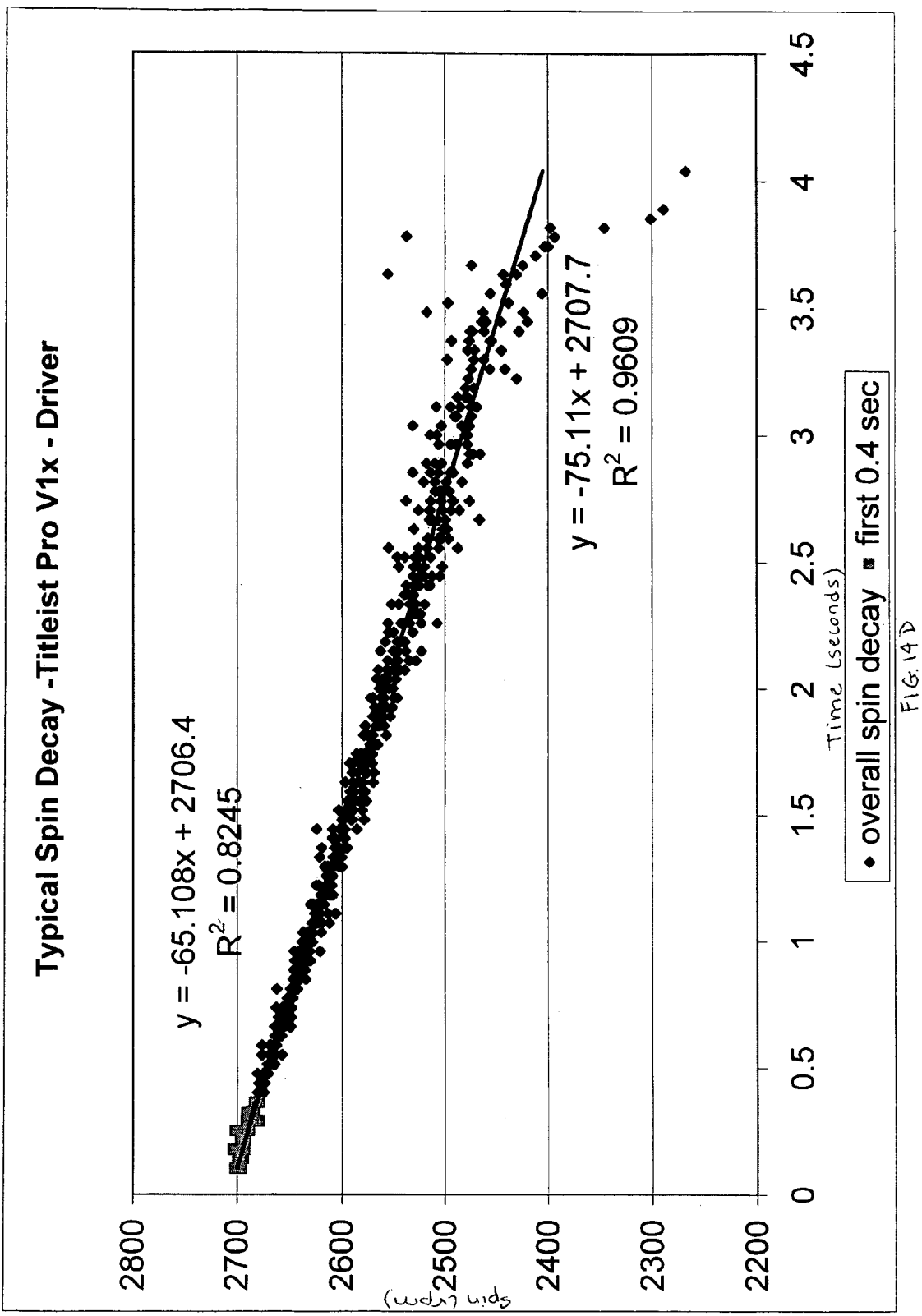

In comparison, FIG. 14D illustrates the spin decay for a current Titleist ProV1x golf ball hit by a driver. As discussed above, the Titleist ProV1x has a non-wound, solid construction. This golf ball results in a regression line for the first 0.4 seconds of flight having a slope of −65.108, while the regression line for the whole flight has a slope of about −75.11. Thus, the difference in slope for the two regression lines is about 10 units.

Preferably, a golf ball made according to the invention will have a rate of spin decay, such that the difference in slopes between the regression lines of the first 0.4 seconds of golf ball flight and the whole golf ball flight will be at least 20 units. More preferably, the difference in slopes will be from about 30 to 250 units. Applicants expect that a golf ball made with a liquid center, having a non-wound mantle portion comprising HNP will result in a spin decay, such that the difference in slope for the two regression lines will be more similar to prior art golf balls having a wound construction with a liquid center than current solid non-wound golf balls, such as the ProV1x.

A prophetic example of a non-wound golf ball construction possessing desirable spin rate decay properties similar to a wound golf ball, such as the Titleist Professional, could be achieved by providing a golf ball having a liquid center with a diameter of 1.125 inches. The liquid center may have a specific gravity of approximately 1.3 and a viscosity of approximately 1000 cps. The liquid center would be enclosed with a mantle portion having a diameter of 1.580 inches and the mantle portion would be comprised of a HNP, in a manner similar to that discussed above and illustrated in FIG. 12.

The distance that a golf ball would travel upon impact is a function of the coefficient of restitution (COR) and the aerodynamic characteristics of the ball. The COR is defined as the ratio of the relative velocity of two colliding objects after the collision to the relative velocity of the two colliding objects prior to the collision. The COR varies from 0 to 1.0. A COR value of 1.0 is equivalent to a perfectly elastic collision, and a COR value of 0.0 is equivalent to a perfectly inelastic collision. For golf balls, COR has been approximated as a ratio of the velocity of the golf ball after impact to the velocity of the golf ball prior to impact. Preferably, a golf ball according to the invention has a COR of at least 0.78, more preferably, at least 0.80.

In another embodiment, a reduced flight golf ball according to the invention may be made. Preferably, the mantle portion 16 and the liquid center shell 20 have an inner diameter of approximately 0.25 to 1.5 inches and, more preferably, an inner diameter of approximately 0.5 to 1.35 inches. The mantle portion 16 preferably has a thickness of 0.05 to 0.35 inches, and more preferably 0.07 to 0.3 inches and may comprise one or more layers or plys of the same or different materials. Preferably, the mantle portion is comprised of HNP, as discussed previously, and more preferably the HNP would be selected from those disclosed in U.S. application Ser. No. 11/270,066, filed Nov. 9, 2005, the entire disclosure of which previously was incorporated by reference herein. The shell 20 and the fluid center 18 may be comprised of any materials previously described herein. Alternatively, and as discussed previously, the fluid center 18 may be enclosed by the mantle portion 16, without a shell 20. Preferably, a reduced flight golf ball made according to these embodiments will have a COR of at most 0.75, more preferably at most 0.725, and most preferably at most 0.70.

According to one aspect of the present invention, the golf ball is formulated to have a compression of between about 70 and about 120.

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

In one embodiment, the liquid core 12 comprises an aqueous sugar solution housed in a polyethylene or polypropylene shell 20. The shell 20 has a wall thickness of 0.03 inches and an outer diameter of 1.25 inches. A mantle layer 22 covers the shell and is comprised of an HNP, such as DuPont HPF 2000. The mantle layer 22 has a thickness of 0.15 inches. An inner cover layer is placed over the mantle layer and comprises an ionomer having a flexural modulus of at least 60,000 psi. The inner cover layer has a thickness of 0.35 inches. An outer cover layer is provided over the inner cover layer and is comprised of polyurethane or polyurea having a flexural modulus of less than 40,000 psi. Preferably, the golf ball preferably has a COR of greater than 0.78, and more preferably, greater than 0.8, and a compression of 70 to 120. Preferably, the golf ball has a rate of spin decay of at least 10% of initial spin, and more preferably at least 15% of initial spin.

In another embodiment, the liquid core 12 comprises a low viscosity naphthenic oil housed in a crosslinked acrylonitrile rubber shell 20. The shell 20 has an outer diameter of 1 inch. The shell 20 is encased by a mantle layer 22 of a crosslinked polybutadiene rubber. The mantle layer 22 has a thickness of 0.29 inches. A single cover layer 11 is provided on the mantle layer 22. The cover 11 is comprised of an ionomer or polyurethane having a thickness of 0.05 inches and a modulus of about 40,000 to 70,000 psi. Preferably, the golf ball has a COR of at least 0.8 and a compression of 80 to 100. Preferably, the golf ball has a rate of spin decay of at least 10% of initial spin, and more preferably at least 15% of initial spin.

In another embodiment, the mantle layer 22 is comprised of a HNP having a specific gravity of 0.9. An inner cover layer is provided on the mantle layer 22. The inner cover layer may be a thin dense layer as disclosed in U.S. Pat. No. 6,743,123, the entire disclosure of which is incorporated by reference herein.

The present invention relates to golf balls of any size. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.900 inches. The more preferred diameter is from about 1.680 inches to about 1.760 inches. A diameter of from about 1.680 inches to about 1.740 inches is most preferred; however, diameters anywhere in the range of from 1.680 to about 1.950 inches can be used. Preferably, the overall diameter of the core and all mantle or intermediate layers is about 80 percent to about 98 percent of the overall diameter of the finished ball.

The core may have a diameter ranging from about 0.090 inches to about 1.650 inches. In one embodiment, the diameter of the core of the present invention is about 1.200 inches to about 1.630 inches. In another embodiment, the diameter of the core is about 1.300 inches to about 1.600 inches, preferably from about 1.390 inches to about 1.600 inches, and more preferably from about 1.500 inches to about 1.600 inches. In yet another embodiment, the core has a diameter of about 1.550 inches to about 1.650 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.540 inches or greater, preferably about 1.550 inches or greater. In one embodiment, the core diameter is about 1.590 inches or greater. In another embodiment, the diameter of the core is about 1.640 inches or less. Thus one embodiment encompasses golf balls having a single layer cover and a large core having a diameter of about 1.540 inches or greater. Another embodiment encompasses golf balls having more than one cover layers and a large core having a diameter of about 1.540 inches or greater.

Another embodiment encompasses a golf ball having various weight distributions of its components. Such golf balls comprise a core and a cover wherein the weight or mass of the ball is allocated radially relative to the centroid, thereby dictating the moment of inertia of the ball. When the weight is allocated radially toward the centroid, the moment of inertia is decreased, and when the weight is allocated outward away from the centroid, the moment of inertia is increased.

The present invention also encompasses golf balls comprising a core and a cover wherein the weight or mass of the ball is allocated radially relative to the centroid, thereby dictating the moment of inertia of the ball and the golf ball may have an additional intermediate mantle and/or a cover. Distributing the weight or mass of the ball either toward the outer surface of the ball changes the dynamic characteristics of the ball at impact and in flight. In particular, then the weight is allocated radially toward the centroid, the moment of inertia is decreased, and the initial spin rate of the ball as it leaves the golf club would increase due to lower resistance from the ball's moment of inertia. Conversely, the weight is allocated outward away from the centroid, the moment of inertia is increased, and the initial spin rate of the ball as it leaves the golf club would decrease due to the higher resistance from the ball's moment of inertia. Accordingly, the radial distance from the center of the ball or from the outer cover, where the moment of inertia switches from being increased and to being decreased as a result of the redistribution of weight or mass density, is an important factor in golf ball design.

The moment of inertia for a one piece ball that is 1.62 ounces and 1.68 inches in diameter is approximately 0.4572 oz-in$^2$, which is the baseline moment of inertia value. The present invention encompasses golf balls having a light center and heavy cover and mantle layers and having a moment of inertia of greater than 0.460 oz-in$^2$. Also contemplated are golf balls having a heavy core (including center and mantle layers) and light cover layer and having a moment of inertia of less than 0.450 oz-in$^2$.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. The cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer is between about 0.02 inches to about 0.045 inches. In still another embodiment, the outer cover layer is about 0.025 to about 0.04 inches thick. In one embodiment, the outer cover layer is about 0.03 inches thick.

The range of thicknesses for a mantle layer of a golf ball is large because of the vast possibilities when using a mantle layer, i.e., as an outer core layer, an inner cover layer, a wound layer, a moisture/vapor barrier layer. When used in a golf ball of the invention, the mantle layer, or inner cover layer, may have a thickness about 0.3 inches or less. In one embodiment, the thickness of the mantle layer is from about 0.002 inches to about 0.1 inches, preferably about 0.01 inches or greater. In one embodiment, the thickness of the mantle layer is about 0.09 inches or less, preferably about 0.06 inches or less. In another embodiment, the mantle layer thickness is about 0.05 inches or less, more preferably about 0.01 inches to about 0.045 inches. In one embodiment, the mantle layer, thickness is about 0.02 inches to about 0.04 inches. In another embodiment, the mantle layer thickness is from about 0.025 inches to about 0.035 inches. In yet another embodiment, the thickness of the mantle layer is about 0.035 inches thick. In still another embodiment, the inner cover layer is from about 0.03 inches to about 0.035 inches thick. Varying combinations of these ranges of thickness for the mantle and outer cover layers may be used in combination with other embodiments described herein.

The ratio of the thickness of the mantle layer to the outer cover layer is preferably about 10 or less, preferably from about 3 or less. In another embodiment, the ratio of the thickness of the mantle layer to the outer cover layer is about 1 or less.

The core and optional mantle layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, the inner ball of a 1.68-inch ball has a diameter of about 1.59 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Turning to the preferred method for making the ball of the present invention, the inner sphere is produced by forming the liquid center shell 20 to create a central cavity, and filling the cavity with the fluid center 18. A first cup is made by compression molding cup material 31, preferably polybutadiene, between a first substantially hemispherical concave mold part 32 and a protrusive mold part 34. The protrusive mold part 34 has a first substantially hemispherical protrusion 35 that faces the first concave mold part 32. A second cup is then made in the same manner.

Figure 4:
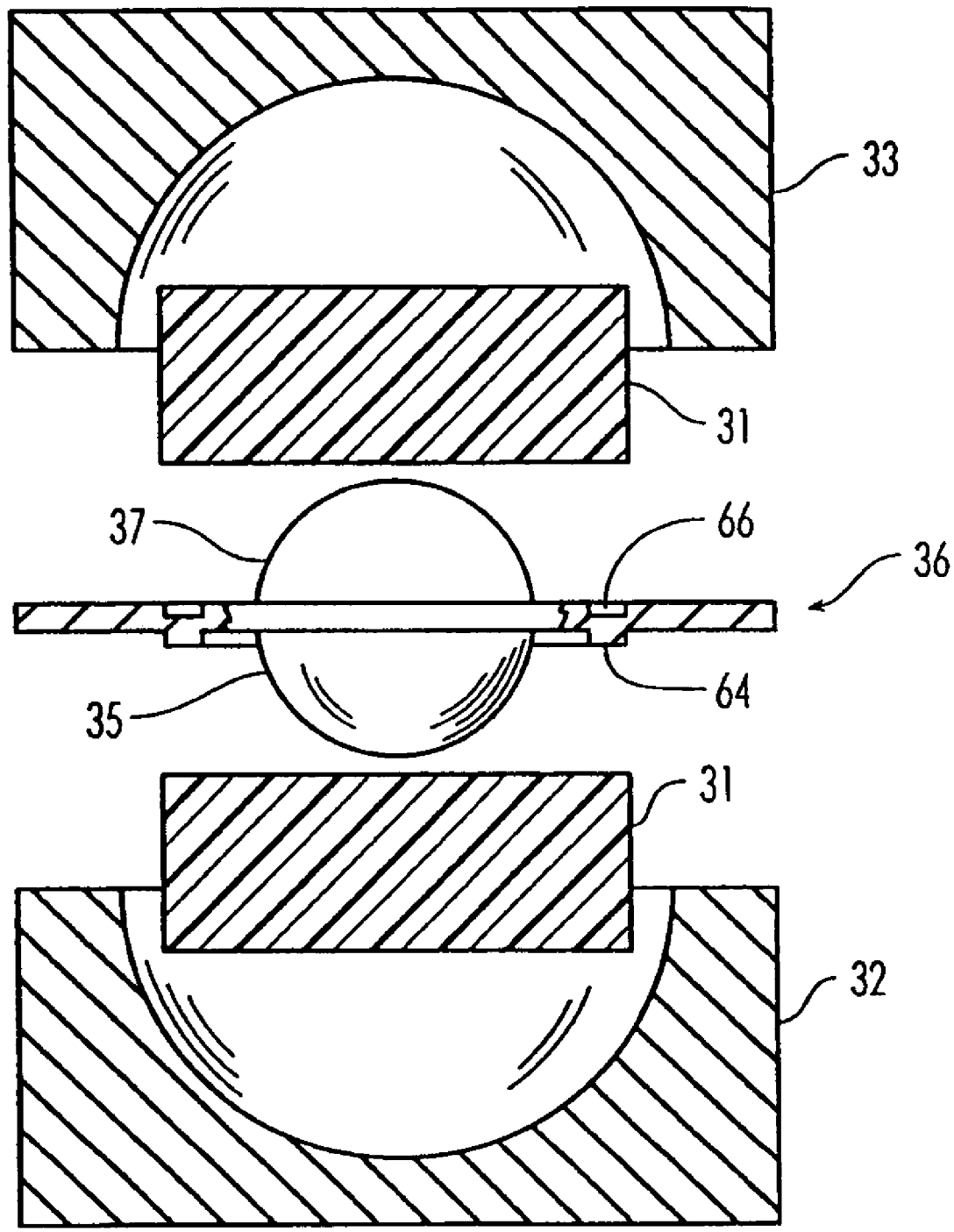
FIG. 4 is a sectional view of molds preforming a mantle layer's cups according to the present invention.

Alternatively, as shown in FIG. 4, the two cups 30 are simultaneously compression molded about a single protrusive mold part 36 that has first and second protrusions 35 and 37. First and second hemispherical molds 32 and 33 are positioned opposite each other and protrusive mold part 36 is placed between the hemispherical molds 32 and 33.

Figure 5:
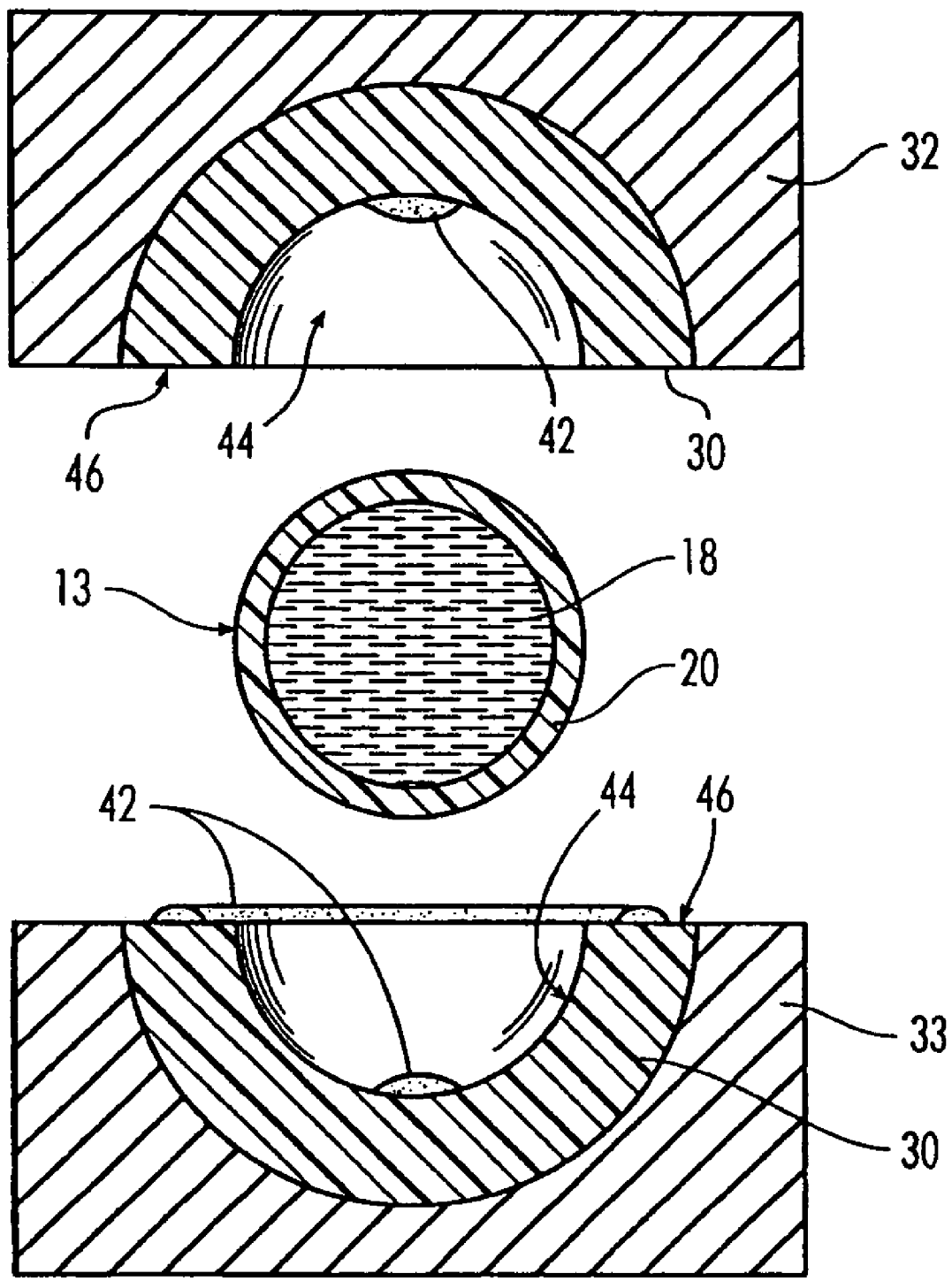
FIG. 5 is a sectional view of molds joining cups of a golf ball mantle layer.

FIG. 5 shows two concave mold parts 32 and 33 after cups 30 have been molded. Each hemispherical cup 30 has a hemispherical cavity 44. Disposed around the cavities 44, the cups 30 have mating surfaces 46, which are substantially flat in this embodiment.

At this point in the process, the inner sphere 13 is placed in the cups 30, and the two cups 30 are joined. Cups 30 are preferably kept in their respective hemispherical molds 32 and 33 during this step. The preferred method for joining the cups 30 is to place adhesive 42 between the cups by applying the adhesive to one of the cups 30 as shown in FIG. 5. The cups 30 are then brought together, squeezing the adhesive evenly across the mating surfaces of the cups 30. The adhesive 42 then sets and bonds the cups 30 to one another. The adhesive is also preferably applied such that it bonds the inner sphere 13 to the cups 30 by placing adhesive 42 within the cavities. As with the adhesive 42 placed between cups, the adhesive 42 placed between the cups 30 and the inner sphere 13 is spread evenly upon joining the cups 30 to one another. The hemispherical cavities 44 of the joined cups together form a spherical cavity, occupied by the inner sphere 12.

Another method for joining the cups 30 is to compress them together at an elevated temperature to cause crosslinking between the elastomeric cup material of each cup 30. In the embodiment shown in FIG. 4, this may be achieved by removing protrusive mold part 36, and running the compression mold through a second cycle, heating and compressing the cups 30 together.

Figure 6:
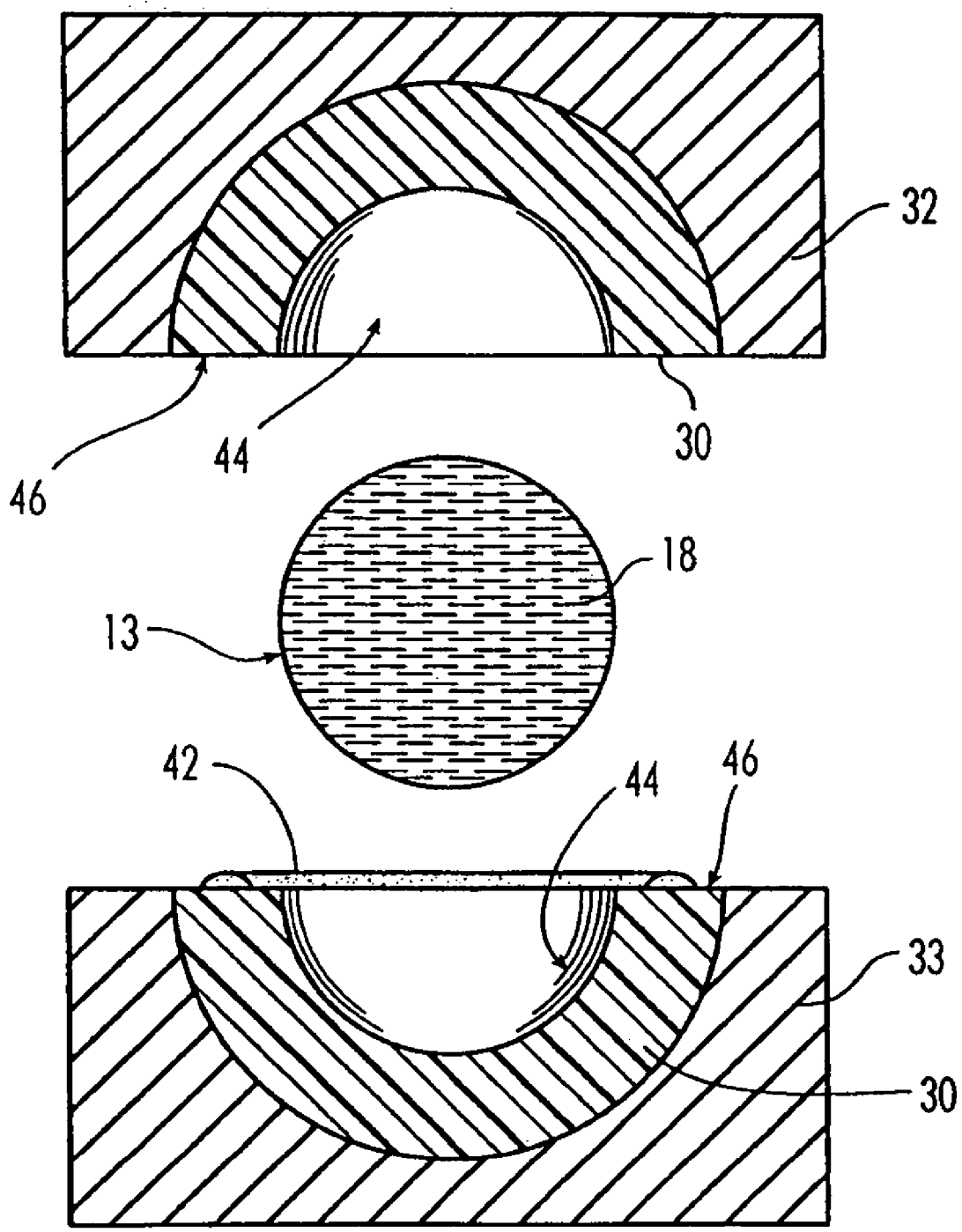
FIG. 6 is a sectional view of the mold joining cups of a golf ball mantle layer around an inner sphere of frozen fluid.

FIG. 6 shows the inner sphere 13 and the cups 30 prior to their being joined. In this embodiment, the inner sphere is merely a sphere of frozen fluid 18 that placed between the cups 30, and around which the cups 30 are joined, preferably before the fluid 18 begins to melt.

Figure 8:
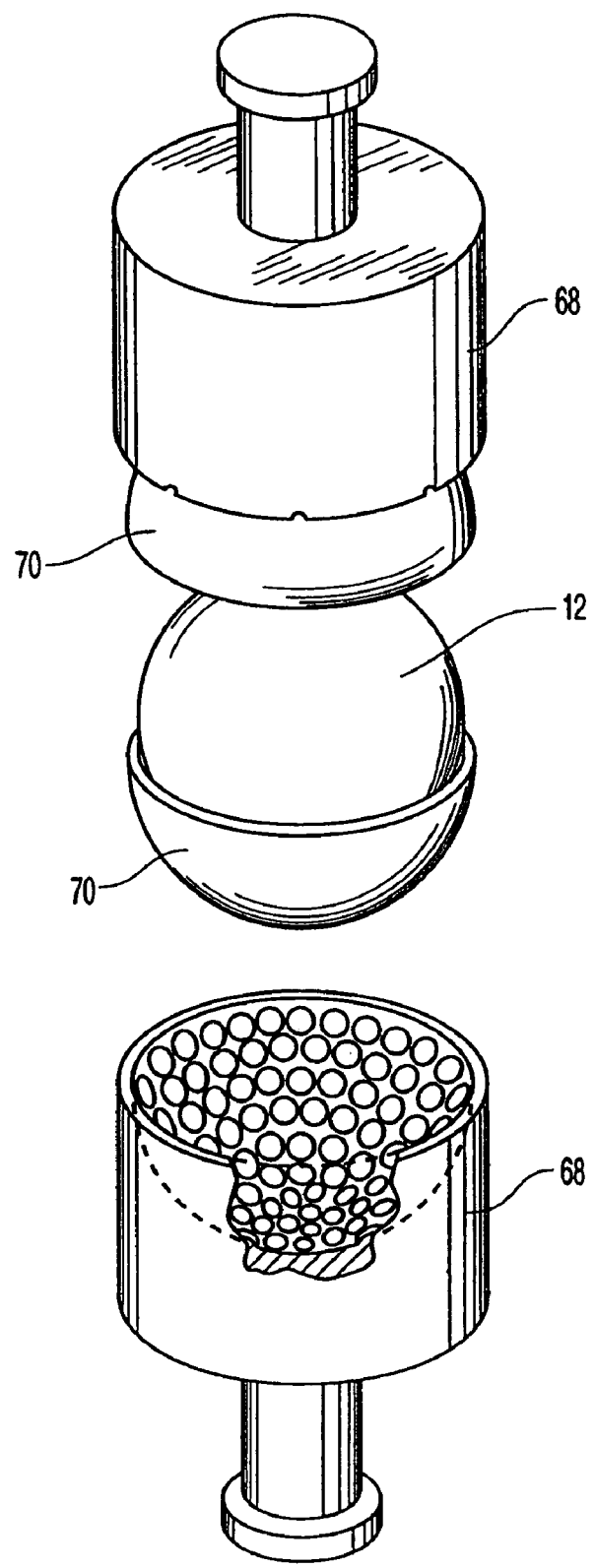
FIG. 8 illustrates a compression mold forming a cover around a golf ball core.
Figure 9:
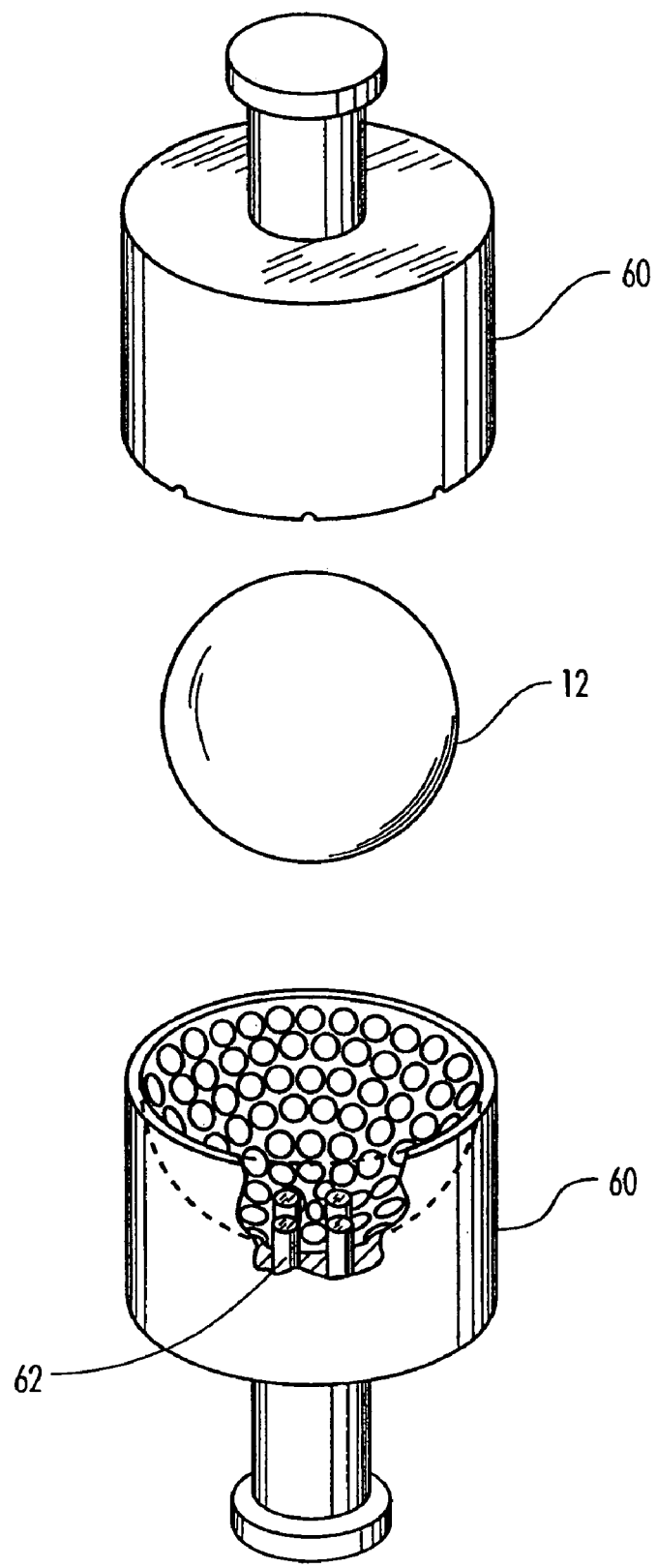
FIG. 9 shows an injection mold forming a cover around a core.

Once the cups 30 are joined, the cover 11 is formed around the core 12, as seen in FIG. 8. FIG. 8 illustrates a step of compression molding two halves 70 of a cover 11 around the core 12 in a dimpled mold 68. FIG. 9 shows a step of injection molding the cover 11 around the core 12 in a dimpled mold 60 with pins 62 that position the core 12 within the dimpled mold 60 and retract before the cover 11 cures completely.

Figure 7:
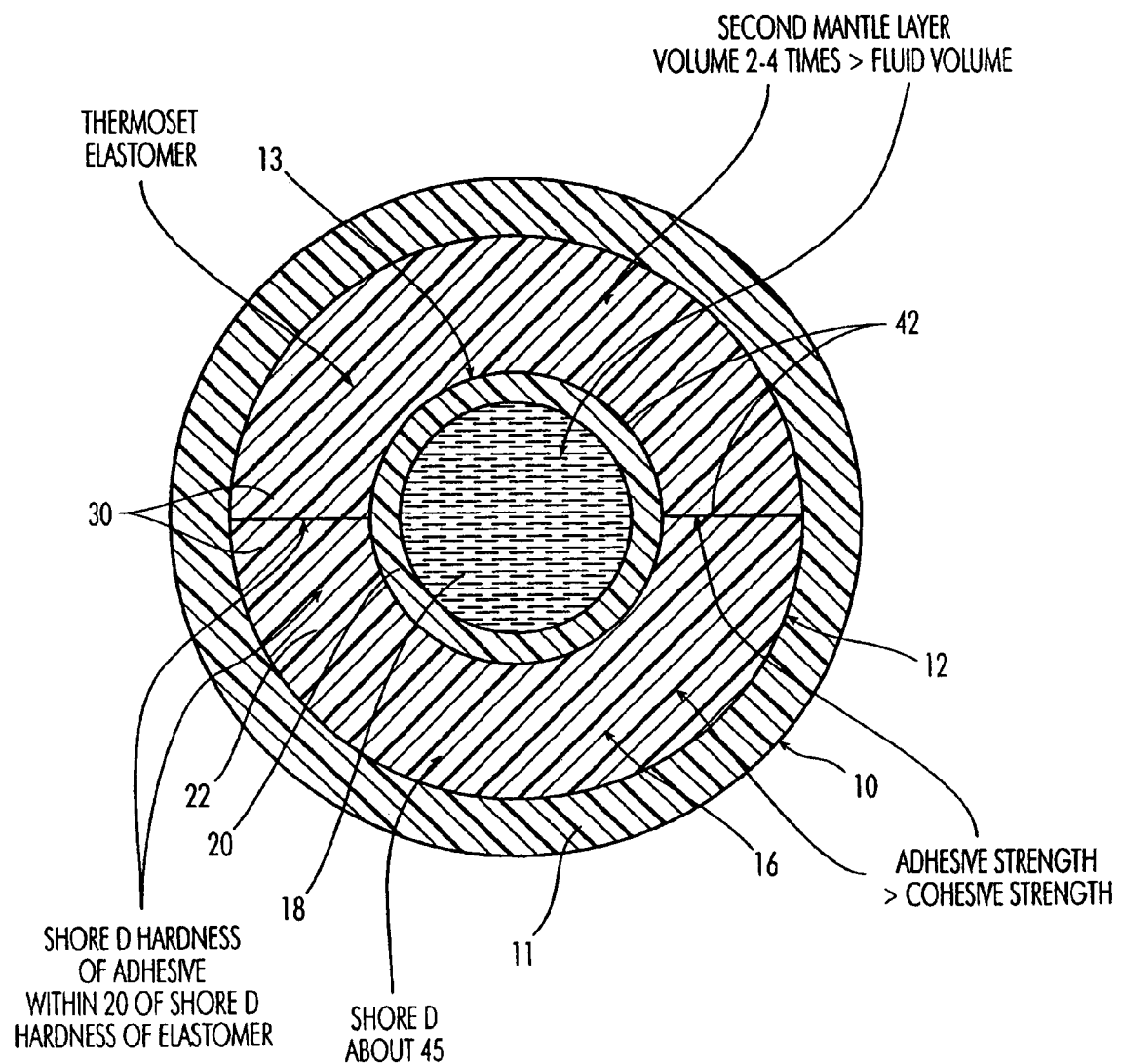
FIG. 7 is a sectional view of a ball according to the invention having adhesive joining the cups.

The golf ball of FIG. 7 has been formed by adhesively joining the cups 30. Adhesive 42 extends between the cups in the first mantle layer 22, and between the each cup 30 and the inner sphere 13. The adhesive 42 preferably has an adhesive strength that is greater than the cohesive strength of the elastomeric cup material. Thus, a ball can be manufactured that is at least as strong as a ball in which the mantle layer is made from a single piece of cup material, because the elastomer forming the cups 30 will fail under a lighter load than the adhesive 42. Ideally, the adhesive 42 is flexible in its cured state and has physical properties similar to those of the cup material employed.

A preferred adhesive for use with polybutadiene cups 30 is an epoxy, formed by blending low viscosity liquid resins, and formulated to be flexible in its cured state. A suitable epoxy is formed by mixing an approximately 1:1 volume ratio of about 83 parts by weight of AB-82 hardener into 100 parts by weight of Epoxy Resin #1028, both of which are sold by RBC Industries, Inc. In its liquid state, the epoxy is ideal for use in metering, mixing, and dispensing equipment. This epoxy is preferably cured at 77° F. for 18 to 24 hours, at 95° F. for 6 hours, at 120° F. for 3 hours, or at 150° F. for 1 hour. The cured adhesive's physical properties resemble those of elastomeric urethane. It exhibits an Izod impact strength of 5.50 ft. lbs./in. of notch, a tensile strength at 25° C. of 2,200 psi, a compressive strength at 25° C. of 6,000 psi, and a shore D hardness of 45. Preferably, the shore D of the cured adhesive is within 20 shore D of the hardness of the elastomeric cup material.

Other preferred adhesives are those adhesives containing cyanoacrylate.

Figure 10:
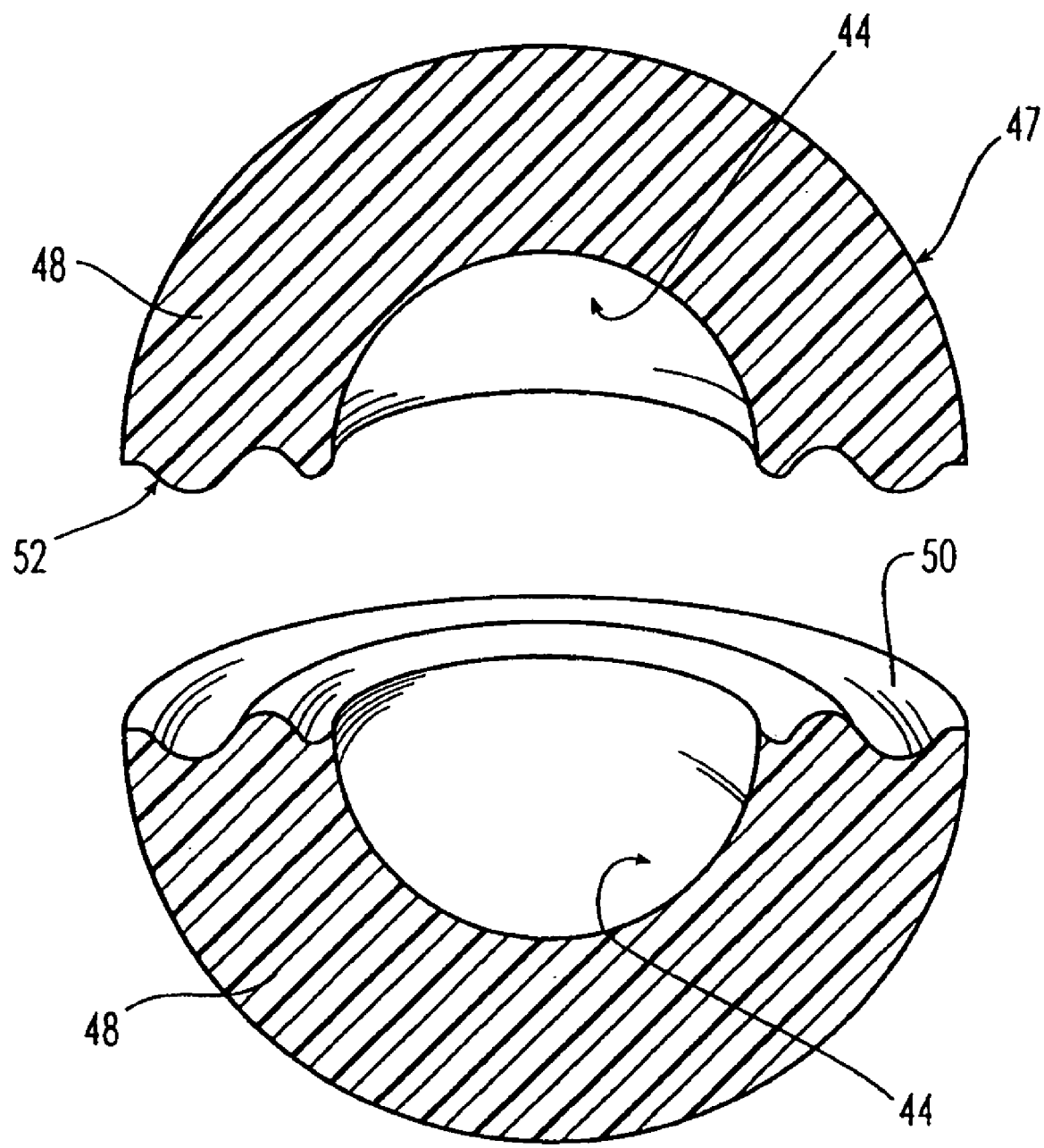
FIGS. 10 and 11 are sectional views of cups with nonplanar mating surfaces that mesh with one another.
Figure 11:
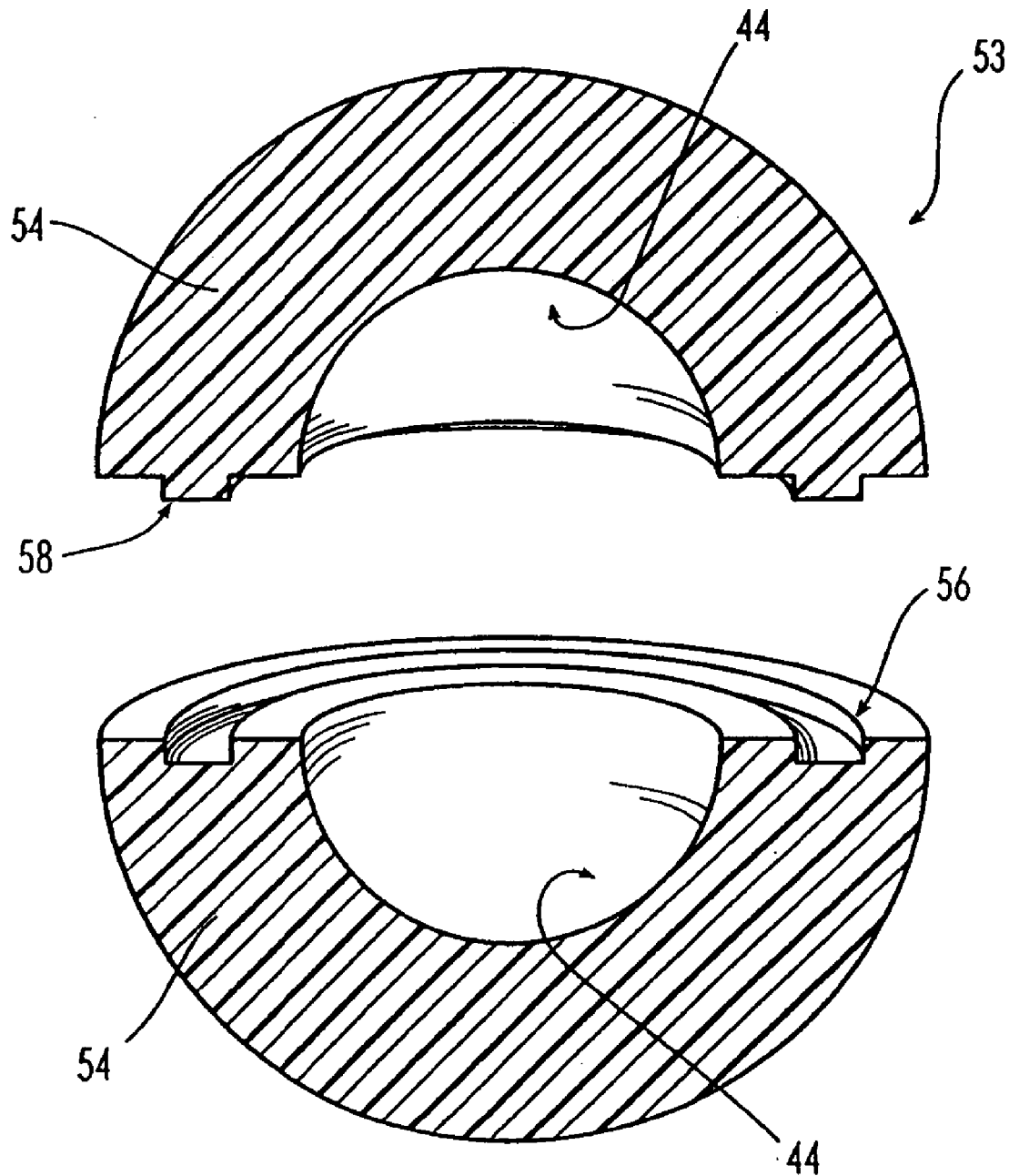

FIGS. 10 and 11 show alternative embodiments of cups 48 and 54. Instead of having flat mating surfaces, cups 48 and 54 have nonplanar mating surfaces 50 and 52, and 56 and 58. These surfaces 50 and 52, and 56 and 58 each have a circular pattern of ridges that is preferably symmetrical about the cavity 44 of each cup 48 and 54; the patterns shown are concentric with the cups 48 and 54. In ball 53, surface 58 has a tongue that engages a groove of surface 56. In the finished golf balls 47 and 53, nonplanar surfaces 50 and 52 are arranged to mesh with each other, as are nonplanar surfaces 56 and 58. These nonplanar mating surfaces 50 and 52 are preferably formed by molding the cups 48 or 54 with protrusive mold parts that have nonplanar surfaces surrounding their protrusions, such as the protrusive mold part 36 with nonplanar surfaces 64 and 66, as shown in FIG. 4.

The liquid center shell and mantle layers in the mantle portion 16 of golf balls with nonplanar mating surfaces retain more of the properties of the elastomers that form the cups, when the cups are forced in shear with respect to each other, as compared to a golf ball with flat mating surfaces. Nonplanar mating surfaces are thus advantageous when an adhesive is used that has an adhesive strength lower than the cohesive strength of the elastomeric cup material. This is because the meshed portions of the cups 48 and 54 aid in resisting shearing forces between the two cups 48 and 54.

While it is apparent that the illustrative embodiments of the invention herein disclosed fulfills the objectives stated above, it will be appreciated that numerous modifications and other embodiments may be devised by those skilled in the art, for example, a series of progressively larger diameter cups can be formed and joined by the methods disclosed. Therefore, it will be understood that the appended claims are intended to cover all such modifications and embodiments which come within the spirit and scope of the present invention.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, the compositions of the present invention may be used in a variety of golf equipment, for example, golf shoes for sole applications, as well as in inserts for golf putters. Such modifications are also intended to fall within the scope of the appended claims.

Various examples of golf ball cores according to the invention are set forth below.

EXAMPLES

The following examples are illustrative of the invention:

Example 1

A core according to the present invention was created having a liquid center, a liquid center shell surrounding the liquid center and a first mantle layer surrounding the liquid center shell.

The liquid was a salt, water and corn syrup solution comprised of 40% salt, 30% water and 30% corn syrup. The liquid center had an outside diameter of approximately 0.965 inches.

The liquid center shell was created from a thermoplastic elastomer. The liquid center shell had an outside diameter of approximately 1.125 inches.

The first mantle layer was created from crosslinked polybutadiene. The first mantle layer had an outside diameter of approximately 1.51 inches.

The core weighed 38.9 g and had a PGA compression of less than 60.

Example 2

A core according to the present invention was created having a liquid center, liquid center shell surrounding the liquid center and a first mantle layer surrounding the liquid center shell.

The liquid was a salt, water and corn syrup solution comprised of 40% salt, 30% water and 30% corn syrup. The liquid filled center had an outside diameter of approximately 0.938 inches.

The liquid center shell was created from polypropylene. The liquid center shell had an outside diameter of approximately 1.0625 inches.

The first mantle layer was created from crosslinked polybutadiene. The first mantle layer had an outside diameter of approximately 1.51 inches.

The core weighted 33.4 g and had a PGA compression of approximately 60.

Example 3

A core according to the present invention was created having a fluid center, a liquid center shell surrounding the fluid center and a first mantle layer surrounding the liquid center shell.

The fluid was air. The fluid center had an outside diameter of approximately 0.938 inches.

The liquid center shell was created from polypropylene. The liquid center shell had an outside diameter of approximately 1.0625 inches.

The first mantle layer was created from crosslinked polybutadiene. The first mantle layer had an outside diameter of approximately 1.51 inches.

The core weighed 26 g and had a PGA compression of approximately 87.

We claim:

1. A golf ball having a diameter and being comprised of a core and a cover, wherein the core is further comprised of a fluid mass at the center of the ball, and a first, solid, non-wound layer surrounding the fluid mass, wherein the first layer comprises a copolymer or terpolymer of ethylene and an $\alpha,\beta$-unsaturated carboxylic acid, the acid being neutralized at least 80% by a salt of an organic acid or a suitable base of the organic acid, and a less hydrophilic cation source, and wherein the cover comprises polyurethane, polyurea, or a polyurea/polyurethane hybrid.

2. The golf ball of claim 1, wherein the first layer acid being neutralized by contacting one or more acid polymer(s) with an organic acid or a metal salt of an organic acid and a sufficient amount of a less hydrophilic cation source such that at least 90% of all acid functionalities present in the polymer composition are neutralized.

3. The golf ball of claim 2, wherein about 100% of all acid functionalities present in the polymer composition are neutralized.

4. The golf ball of claim 2, wherein the acid polymer is partially neutralized prior to contacting with the less hydrophilic cation source.

5. The golf ball of claim 1, wherein the less hydrophilic cation source is selected from metal ions and compounds of potassium, cesium, calcium, barium, manganese, copper, zinc, and tin; silicone, silane, and silicate derivatives and complex ligands; and metal ions and compounds of rare earth elements.

6. The golf ball of claim 1, wherein the first layer has a thickness of about 0.04 to 0.56 inches.

7. The golf ball of claim 1, wherein the golf ball further comprises a second layer encompassing the first layer.

8. The golf ball of claim 1, wherein the first layer further comprises polybutadiene.

9. The golf ball of claim 1, wherein the fluid mass is a gas, liquid, gel, paste or a combination thereof.

10. The golf ball of claim 1, wherein the specific gravity of the fluid mass is about 1.3 to 1.55.

11. The golf ball of claim 1, wherein the viscosity of the fluid mass is about 100 to 1500 cps.

12. The golf ball of claim 1, wherein the cover comprises an inner cover layer and a thin outer cover layer, wherein the outer cover layer comprises a thermoset material formed from a castable, reactive liquid and the inner cover layer comprises a high flexural modulus material.

13. The golf ball of claim 1, wherein the golf ball has a COR of at least 0.8.

14. The golf ball of claim 1, wherein the first layer has a Shore C of 45 to 90.

15. The golf ball of claim 1, wherein the core has a compression of 87 or less.

16. The golf ball of claim 1, wherein the first layer has a moisture vapor transmission rate of 8 g-mil/100 in$^2$/day or less.

17. The golf ball of claim 16, wherein the first layer has a moisture vapor transmission rate of 2 g-mil/100 in$^2$/day or less.

18. A golf ball having a diameter and being comprised of a core and a cover, wherein the core is further comprised of a fluid mass at the center of the ball, a shell encompassing the fluid mass, and a first, solid, non-wound mantle layer surrounding the shell, wherein the first mantle layer comprises a copolymer or terpolymer of ethylene and an $\alpha,\beta$-unsaturated carboxylic acid, the acid being neutralized at least 80% by a salt of an organic acid or a suitable base of the organic acid, and a less hydrophilic cation source, and wherein the cover comprises polyurethane, polyurea, or a polyurea/polyurethane hybrid.

19. The golf ball of claim 18, wherein the polymer composition acid being neutralized by contacting one or more acid polymer(s) with an organic acid or a metal salt of an organic acid and a sufficient amount of a less hydrophilic cation source such that at least 90% of all acid functionalities present in the polymer composition are neutralized.

20. The golf ball of claim 19, wherein about 100% of all acid functionalities present in the polymer composition are neutralized.

21. The golf ball of claim 19, wherein the acid polymer is partially neutralized prior to contacting with the less hydrophilic cation source.

22. The golf ball of claim 18, wherein the less hydrophilic cation source is selected from metal ions and compounds of potassium, cesium, calcium, barium, manganese, copper, zinc, and tin; silicone, silane, and silicate derivatives and complex ligands; and metal ions and compounds of rare earth elements.

23. The golf ball of claim 18, wherein the first mantle layer has a thickness of about 0.04 to 0.35 inches.

24. The golf ball of claim 18, wherein the first mantle layer further comprises polybutadiene.

25. The golf ball of claim 18, wherein the fluid mass is a gas, liquid, gel, paste or a combination thereof.

26. The golf ball of claim 18, wherein the specific gravity of the fluid mass is about 1.3 to 1.55.

27. The golf ball of claim 18, wherein the viscosity of the fluid mass is about 100 to 1500 cps.

28. The golf ball of claim 18, where the golf ball has a rate of spin decay of at least 10% of the initial spin rate over the entire ball flight.

29. The golf ball of claim 18, wherein the first layer has a Shore C of 45 to 90.

30. The golf ball of claim 18, wherein the core has a compression of 87 or less.

31. The golf ball of claim 18, wherein the first layer has a moisture vapor transmission rate of 8 g-mil/100 in$^2$/day or less.

32. The golf ball of claim 31, wherein the first layer has a moisture vapor transmission rate of 2 g-mil/100 in$^2$/day or less.

33. A golf ball having a diameter and being comprised of a core and a cover, wherein the core is further comprised of a fluid mass at the center of the ball, and a first, solid, non-wound mantle layer surrounding the fluid mass, wherein the first mantle layer comprises a copolymer or terpolymer of ethylene and an α, β-unsaturated carboxylic acid, the acid being neutralized at least 80% by a salt of an organic acid or a suitable base of the organic acid and a less hydrophilic cation source, and wherein the cover comprises polyurethane, polyurea, or a polyurea/polyurethane hybrid, wherein the rate of spin decay is at least 10% of an initial spin rate of the golf ball over the entire ball flight.

34. The golf ball of claim 33, wherein the polymer composition acid being neutralized by contacting one or more acid polymer(s) with an organic acid or a metal salt of an organic acid and a sufficient amount of a less hydrophilic cation source such that at least 90% of all acid functionalities present in the polymer composition are neutralized.

35. The golf ball of claim 34, wherein about 100% of all acid functionalities present in the polymer composition are neutralized.

36. The golf ball of claim 34, wherein the acid polymer is partially neutralized prior to contacting with the less hydrophilic cation source.

37. The golf ball of claim 33, wherein the less hydrophilic cation source is selected from metal ions and compounds of potassium, cesium, calcium, barium, manganese, copper, zinc, and tin; silicone, silane, and silicate derivatives and complex ligands; and metal ions and compounds of rare earth elements.

38. The golf ball of claim 33, wherein the first mantle layer has a thickness of about 0.04 to 0.56 inches.

39. The golf ball of claim 33, wherein the first mantle layer further comprises polybutadiene.

40. The golf ball of claim 33, wherein the golf ball further comprises a shell encompassing the fluid mass.

41. The golf ball of claim 33, wherein the fluid mass is a gas, liquid, gel, paste or a combination thereof.

42. The golf ball of claim 33, wherein the specific gravity of the fluid mass is about 1.3 to 1.55.

43. The golf ball of claim 33, wherein the viscosity of the fluid mass is about 100 to 1500 cps.

44. The golf ball of claim 33, wherein the cover comprises an inner cover layer and a thin outer cover layer, wherein the outer cover layer comprises a thermoset material formed from a castable, reactive liquid and the inner cover layer comprises a high flexural modulus material.

45. The golf ball of claim 33, where the golf ball has a rate of spin decay of at least 15% of the initial spin rate over the entire ball flight.

* * * * *